US011449999B2

(12) United States Patent
Maruo et al.

(10) Patent No.: US 11,449,999 B2
(45) Date of Patent: Sep. 20, 2022

(54) DISPLAY CONTROL DEVICE, METHOD FOR OPERATING DISPLAY CONTROL DEVICE, AND PROGRAM FOR OPERATING DISPLAY CONTROL DEVICE

(71) Applicant: FUJIFILM Corporation, Tokyo (JP)

(72) Inventors: Yusuke Maruo, Tokyo (JP); Shun Hotta, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 40 days.

(21) Appl. No.: 17/013,647

(22) Filed: Sep. 6, 2020

(65) Prior Publication Data

US 2021/0097688 A1   Apr. 1, 2021

(30) Foreign Application Priority Data

Sep. 30, 2019   (JP) .............................. JP2019-180385

(51) Int. Cl.
*G06K 9/00* (2022.01)
*G06T 7/00* (2017.01)
(Continued)

(52) U.S. Cl.
CPC .......... *G06T 7/0014* (2013.01); *G06F 3/1423* (2013.01); *G06T 11/003* (2013.01);
(Continued)

(58) Field of Classification Search
CPC ................. G06T 7/0014; G06T 11/003; G06T 2207/10072; G06T 2207/10132;
(Continued)

(56) References Cited

U.S. PATENT DOCUMENTS 6,542,771 B2   4/2003   Saotome et al.
7,760,924 B2   7/2010   Ruth et al.
(Continued)

FOREIGN PATENT DOCUMENTS

JP   S63269256   11/1988
JP   2000155788   6/2000
(Continued)

OTHER PUBLICATIONS

Office Action of Japan Counterpart Application, with English translation thereof, dated Jun. 21, 2022, pp. 1-5.

*Primary Examiner* — Atiba O Fitzpatrick
(74) *Attorney, Agent, or Firm* — JCIPRNET

(57) ABSTRACT

A display control device including a display and a processor configured to acquire a first image of an object and a second image of the same object as the first image; display the first image including one or more of first regions of interest and the second image including one or more of second regions of interest on the display; receive designation of a position in the first image displayed on the display; specify a designated first region of interest and a designated second region of interest corresponding to the designated first region of interest on the basis of the designation of the position, wherein, in a case in which the processor receives the designation of the position with a state that a plurality of first regions of interest or a plurality of second regions of interest are present in at least one of the first image or the second image, the processor is further configured to display the designated second region of interest so as to be highlighted on the display.

19 Claims, 22 Drawing Sheets

(51) Int. Cl.
*G06T 11/00* (2006.01)
*G06F 3/14* (2006.01)
*G06V 10/25* (2022.01)

(52) U.S. Cl.
CPC .... *G06V 10/25* (2022.01); *G06T 2207/10072* (2013.01); *G06T 2207/30004* (2013.01)

(58) Field of Classification Search
CPC ..... G06T 2207/10136; G06T 7/10–194; G06T 2207/20112; G06T 7/0012–0016; G06T 2207/30004–30104; G06T 7/337; G06T 7/74; G06T 7/11; G06T 2207/30204; G06T 2207/30068; G06T 2200/24; G06T 2207/20104; G06F 3/1423; G06K 9/3233; G06K 9/6224; A61B 5/7485; A61B 6/463; G06V 20/695; G06V 40/162; G06V 20/80; G06V 20/698; G06V 2201/03; G06V 10/25; G06V 10/255; G16H 50/20
See application file for complete search history.

(56) References Cited

U.S. PATENT DOCUMENTS

| | | | |
|---|---|---|---|
| 9,592,019 | B2 | 3/2017 | Sugiyama et al. |
| 10,692,213 | B2 | 6/2020 | Buelow et al. |
| 2013/0050239 | A1* | 2/2013 | Karssemeijer ........ G06T 7/0014 345/589 |
| 2014/0348404 | A1* | 11/2014 | Jerebko ................ G06T 7/33 382/131 |
| 2015/0190105 | A1* | 7/2015 | Sugahara ............. G06T 7/0014 378/20 |
| 2018/0033143 | A1* | 2/2018 | Buelow ................ A61B 6/5217 |
| 2019/0304092 | A1* | 10/2019 | Akselrod-Ballin ....... G06T 7/13 |
| 2020/0372693 | A1* | 11/2020 | Kobayashi ............ A61B 6/025 |

FOREIGN PATENT DOCUMENTS

| | | |
|---|---|---|
| JP | 4163370 | 10/2008 |
| JP | 2015164516 | 9/2015 |
| JP | 2018000984 | 1/2018 |
| JP | 2018512913 | 5/2018 |

* cited by examiner

DISPLAY CONTROL DEVICE, METHOD FOR OPERATING DISPLAY CONTROL DEVICE, AND PROGRAM FOR OPERATING DISPLAY CONTROL DEVICE

CROSS-REFERENCE TO RELATED APPLICATIONS

The present application claims priority under 35 U.S.C. § 119 to Japanese Patent Application No. 2019-180385, filed on Sep. 30, 2019. Each of the above application is hereby expressly incorporated by reference, in its entirety, into the present application.

BACKGROUND OF THE INVENTION

1. Field of the Invention

The present disclosure relates to a display control device, a method for operating a display control device, and a non-transitory computer readable medium for storing a program for operating a display control device.

2. Description of the Related Art

In recent years, in the field of medical image diagnosis, in addition to radiography apparatuses using radiation, such as X-rays, imaging apparatuses using various techniques, such as computed tomography (CT) apparatuses, ultrasound (US) diagnostic apparatuses, magnetic resonance imaging (MRI) apparatuses, positron emission tomography (PET) apparatuses, and single-photon emission computed tomography (SPECT) apparatuses, have been used. As the radiography apparatus, for example, image diagnosis using an imaging apparatus called mammography for capturing the image of the breast has attracted attention in order to promote early detection of breast cancer.

In the mammography, generally, imaging is performed on one breast in at least two directions to acquire two or more breast images. Specifically, examples of the breast image include an image (cranio-caudal view; hereinafter, referred to as a CC image)) acquired by sandwiching the breast in the vertical direction and performing imaging on the breast in the sandwiching direction and an image (medio-lateral oblique view; hereinafter, referred to as an MLO image) acquired by sandwiching the breast in an oblique direction and performing imaging on the breast in the sandwiching direction.

In the medical field, a computer-aided image diagnosis system (hereinafter, referred to as a CAD) has been known which automatically detects a region of interest, such as a lesion, in an examination image acquired by the imaging apparatus and displays the detected region of interest so as to be highlighted. For example, there is a method which detects a region of interest, such as calcification or tumor, in a breast image acquired by imaging using mammography, using the CAD and displays the detected region of interest with a frame on the breast image. JP4163370B discloses a method that detects and displays only a region of interest detected at the same position in an object as a definite region of interest among the regions of interest (abnormal shadow candidates) detected in each of a CC image and an MLO image to improve the reliability of the region of interest.

SUMMARY OF THE INVENTION

In the related art, in image diagnosis, comparative image interpretation has been performed which displays a plurality of examination images on a display device, such as a liquid crystal display, and interprets the examination images while comparing the examination images. For example, in a case in which a CC image and an MLO image which are breast images are displayed on a display device for comparative image interpretation, it is difficult to understand the correspondence relationship between positions in the CC image and the MLO image since the CC image and the MLO image are captured in different imaging directions. In the invention described in JP4163370B, the correspondence relationship between a plurality of regions of interest in the CC image and a plurality of regions of interest in the MLO image is displayed. In the display of the correspondence relationship, for example, marks having the same shape are attached to the regions of interest corresponding to the same position among the regions of interest in the CC image and the MLO image.

As such, in JP4163370B, in a case in which there are corresponding regions of interest between a plurality of images, a device automatically displays marks for identifying the corresponding regions of interest regardless of the operation of the user.

However, in some cases, only the configuration in which the marks for identifying the corresponding regions of interest are displayed regardless of the operation of the user as in JP4163370B is insufficient to understand the correspondence relationship at a glance.

First, in a case in which a plurality of regions of interest are displayed in each of a plurality of images, there are a plurality of pairs of corresponding regions of interest and the number of marks is large. Therefore, it is difficult to understand the correspondence relationship at a glance. Further, even in a case in which only one region of interest is displayed in one image and a plurality of regions of interest are displayed in the other image, it may be difficult to understand the correspondence relationship at first glance. For example, in the technique disclosed in JP4163370B, in a case in which only one region of interest is displayed in one image and one region of interest is displayed in the other image, the correspondence relationship is clearly indicated by the display of the mark. However, in a case in which a plurality of regions of interest close to each other are displayed in the other image, it is difficult to understand which region of interest the mark is displayed for at a glance. This holds for a case in which a plurality of regions of interest close to each other are displayed in one image and one region of interest is displayed in the other image.

The present disclosure has been made in view of the above-mentioned problems and an object of the present disclosure is to provide a display control device, a method for operating a display control device, and a non-transitory computer readable medium for storing a program for operating a display control device that enable a user to understand a correspondence relationship between regions of interest at a glance in a case in which image diagnosis is performed on the basis of images captured in different imaging directions.

According to the present disclosure, there is provided a display control device comprising: an image acquisition unit that acquires a first image of an object and a second image of the same object as the first image which has been captured in a different imaging direction from the first image; a display control unit that displays the first image and the second image acquired by the image acquisition unit on a display unit; a position receiving unit that receives designation of a position in the first image displayed on the display unit by the display control unit; a first region-of-interest specification unit that specifies a first region of interest in the first image on the basis of the designation of the position received by the position receiving unit; and a second region-of-interest specification unit that specifies a second region of interest corresponding to the first region of interest in the second image on the basis of the first region of interest specified by the first region-of-interest specification unit. In a case in which a plurality of the first regions of interest or a plurality of the second regions of interest are present in at least one of the first image or the second image and the position receiving unit receives the designation of the position, the display control unit displays the second region of interest corresponding to the first region of interest specified by the designation of the position so as to be highlighted.

In the display control device according to the present disclosure, in a case in which a plurality of the first regions of interest are present in the first image, a plurality of the second regions of interest are present in the second image, and the position receiving unit receives the designation of the position, the display control unit may display only the second region of interest corresponding to the first region of interest specified by the designation of the position such that the second region of interest is highlighted to be distinguishable from other second regions of interest in the second image.

The display control device according to the present disclosure may further comprise: a region-of-interest detection unit that analyzes the first image and the second image acquired by the image acquisition unit to detect the first region of interest and the second region of interest corresponding to the first region of interest. The display control unit may perform control to display all of the regions of interest detected by the region-of-interest detection unit on the display unit and to display only the second region of interest corresponding to the first region of interest specified by the designation of the position in a case in which the position receiving unit receives the designation of the position.

In the display control device according to the present disclosure, the display control unit may display a plurality of display screens on one or a plurality of the display units.

In the display control device according to the present disclosure, the display screen may include a first display screen for displaying an image interpretation report in which content of image diagnosis is recorded and a second display screen for displaying an image. The display control unit may display the first image and the second image on the second display screen.

In the display control device according to the present disclosure, the display screen may include a first display screen for displaying an image interpretation report in which content of image diagnosis is recorded and a second display screen for displaying an image. The display control unit may display the first image on the first display screen and display the second image on the second display screen, or may display the second image on the first display screen and display the first image on the second display screen.

In the display control device according to the present disclosure, the image acquisition unit may acquire a third image of the object captured in a different imaging direction from the second image. The display control unit may display the first image on the first display screen and display the second image and the third image on the second display screen.

In the display control device according to the present disclosure, the first image and the second image may be images captured on the same examination date.

In the display control device according to the present disclosure, the first image and the third image may be images captured in the same imaging direction.

In the display control device according to the present disclosure, the first image and the second and third images may be images captured on different examination dates.

In the display control device according to the present disclosure, the image acquisition unit may acquire a second image group including a plurality of the second images. The second image group may be an image group including a plurality of images captured in the same imaging direction at different imaging times or an image group including a plurality of tomographic images indicating different tomographic planes of the object.

In the display control device according to the present disclosure, the second region-of-interest specification unit may specify the second region of interest corresponding to the first region of interest from the second image group on the basis of the first region of interest specified by the first region-of-interest specification unit. The display control device may further comprise an image extraction unit that extracts the second image including the second region of interest corresponding to the first region of interest which has been specified by the second region-of-interest specification unit. In a case in which the position receiving unit receives the designation of the position in the first image, the display control unit may display the specified second region of interest corresponding to the first region of interest so as to be highlighted in the second image extracted by the image extraction unit.

In the display control device according to the present disclosure, the display control unit may display a plurality of the second images extracted by the image extraction unit on the second display screen. The display control unit may divide the second display screen into a plurality of regions on the basis of the number of the plurality of second images extracted by the image extraction unit and display the plurality of extracted second images in each of the divided regions.

In the display control device according to the present disclosure, in a case in which an upper limit of the number of second images capable of being displayed on the second display screen is set and the number of second images extracted by the image extraction unit is greater than the upper limit, the display control unit may divide the second images into a plurality of pages and display the second images so as to be switched.

In the display control device according to the present disclosure, in a case in which priorities for displaying the plurality of second images extracted by the image extraction unit are set and the number of second images extracted by the image extraction unit is greater than the upper limit, the display control unit may display the second images on the second display screen in descending order of the priority.

According to the present disclosure, there is provided a method for operating a display control device. The method comprises: an acquisition step of acquiring a first image of an object and a second image of the same object as the first image which has been captured in a different imaging direction from the first image; a display control step of displaying the acquired first and second images on a display unit; a receiving step of receiving designation of a position in the first image displayed on the display unit; a first region-of-interest specification step of specifying a first region of interest in the first image on the basis of the received designation of the position; and a second region-of-interest specification step of specifying a second region of interest corresponding to the first region of interest in the second image on the basis of the specified first region of interest. In a case in which a plurality of the first regions of interest or a plurality of the second regions of interest are present in at least one of the first image or the second image and the designation of the position is received in the receiving step, the second region of interest corresponding to the first region of interest specified by the designation of the position is displayed so as to be highlighted in the display control step.

According to the present disclosure, there is provided a non-transitory computer readable medium for storing a program for operating an image display device. The program causes a computer to function as the image display device comprising: an image acquisition unit that acquires a first image of an object and a second image of the same object as the first image which has been captured in a different imaging direction from the first image; a display control unit that displays the first image and the second image acquired by the image acquisition unit on a display unit; a position receiving unit that receives designation of a position in the first image displayed on the display unit by the display control unit; a first region-of-interest specification unit that specifies a first region of interest in the first image on the basis of the designation of the position received by the position receiving unit; and a second region-of-interest specification unit that specifies a second region of interest corresponding to the first region of interest in the second image on the basis of the first region of interest specified by the first region-of-interest specification unit. In a case in which a plurality of the first regions of interest or a plurality of the second regions of interest are present in at least one of the first image or the second image and the designation of the position is received in the receiving step, the display control unit displays the second region of interest corresponding to the first region of interest specified by the designation of the position so as to be highlighted.

Another display control device according to the present disclosure comprises: a memory that stores commands to be executed by a computer; and a processor configured to execute the stored commands. The processor performs: an acquisition step of acquiring a first image of an object and a second image of the same object as the first image which has been captured in a different imaging direction from the first image; a display control step of displaying the acquired first and second images on a display unit; a receiving step of receiving designation of a position in the first image displayed on the display unit; a first region-of-interest specification step of specifying a first region of interest in the first image on the basis of the received designation of the position; and a second region-of-interest specification step of specifying a second region of interest corresponding to the first region of interest in the second image on the basis of the specified first region of interest. In a case in which a plurality of the first regions of interest or a plurality of the second regions of interest are present in at least one of the first image or the second image and the designation of the position is received in the receiving step, the second region of interest corresponding to the first region of interest specified by the designation of the position is displayed so as to be highlighted in the display control step.

According to the display control device, the method for operating the display control device, and the program for operating the display control device of the present disclosure, it is possible to understand the correspondence relationship between the regions of interest at a glance in a case in which image diagnosis is performed on the basis of the images captured in different imaging directions.

DESCRIPTION OF THE PREFERRED EMBODIMENTS

Figure 1:
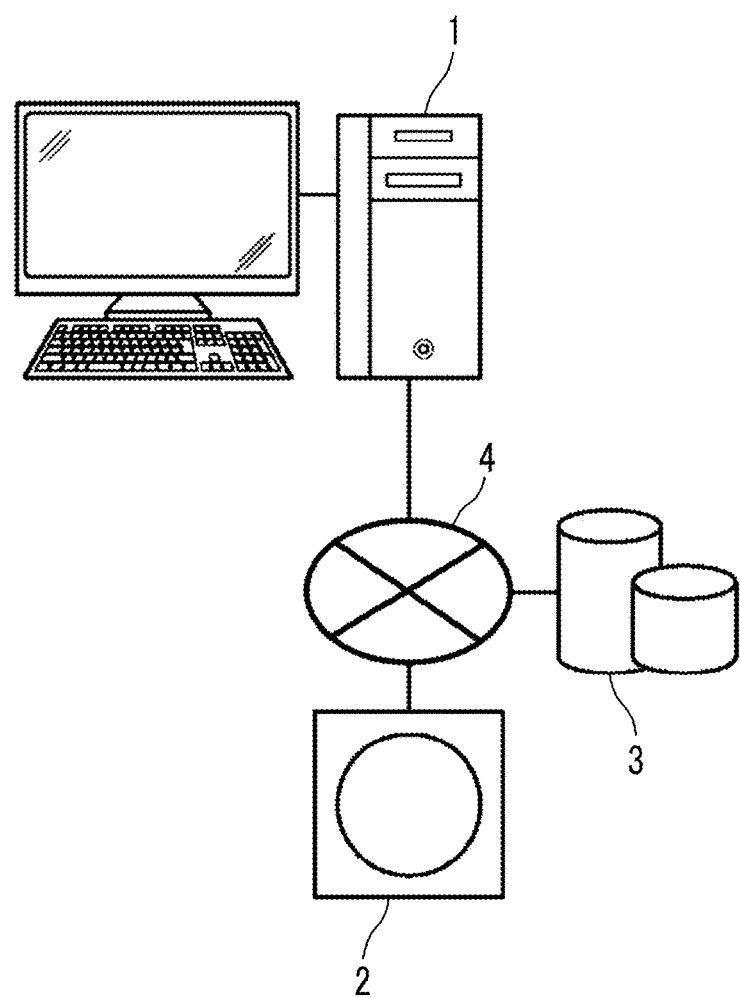
FIG. 1 is a diagram schematically illustrating the outline of a diagnosis support system to which a display control device according to an embodiment of the present disclosure is applied.

Hereinafter, a first embodiment of the present disclosure will be described with reference to the drawings. FIG. 1 is a diagram schematically illustrating a configuration of a diagnosis support system to which a display control device according to an embodiment of the present disclosure is applied. As illustrated in FIG. 1, in the diagnosis support system, a display control device 1, an imaging apparatus 2, and an image storage server 3 according to this embodiment are connected to each other through a network 4 such that they can communicate with each other.

The imaging apparatus 2 is an apparatus that captures an image of a diagnosis target part of a patient which is an example of an object to generate an image indicating the part. Specifically, examples of the imaging apparatus include a radiography apparatus using radiation, such as X-rays, a CT apparatus, an ultrasound diagnostic apparatus, an MRI apparatus, a PET apparatus, and a SPECT apparatus. An example of the radiography apparatus is a mammography apparatus that captures an image of the breast. In this embodiment, the mammography apparatus will be described as an example of the imaging apparatus 2. The mammography apparatus is an imaging apparatus that can perform tomosynthesis imaging in addition to simple imaging in various imaging directions such as MLO imaging and CC imaging. The mammography apparatus generates a two-dimensional projection image of the breast as a breast image, using simple imaging that irradiates the breast with radiation in a direction normal to a detection surface of an image detector. Further, the mammography apparatus performs tomosynthesis imaging that irradiates the breast with radiation from a plurality of positions having different irradiation angles to acquire a plurality of projection images. Then, the mammography apparatus performs an image reconstruction process on the basis of the plurality of projection images acquired by the tomosynthesis imaging to generate a three-dimensional image of the breast. The tomographic images of the breast are tomographic images at each tomographic position of the three-dimensional image. Examination images including, for example, the two-dimensional projection images and the three-dimensional images captured and generated by the mammography apparatus as the imaging apparatus 2 are transmitted to the image storage server 3 and then stored therein.

The image storage server 3 is a computer that stores and manages various kinds of data and comprises a large-capacity external storage device and database management software. The image storage server 3 communicates with other apparatuses through the wired or wireless network 4 to transmit and receive, for example, image data. Specifically, the image storage server 3 acquires various kinds of data including image data of the examination images generated by the imaging apparatus 2 through the network, stores the data in a recording medium, such as a large-capacity external storage device, and manages the stored data. The storage format of the image data and the communication between the apparatuses through the network 4 are based on a protocol such as Digital Imaging and Communication in Medicine (DICOM).

In this embodiment, the image storage server 3 stores the examination images for each patient. The examination images stored for each patient include, for example, a plurality of examination images acquired by a plurality of examinations performed on the same patient. The examination images are stored for each examination. In addition, even in one examination on the same patient, a plurality of examination images are acquired. Examples of the plurality of examination images acquired in one examination include examination images captured under different imaging conditions, such as MLO images obtained by MLO imaging and CC images obtained by CC imaging, in the case of a breast examination. Further, in some cases, the same type of examination is performed a plurality of times on a plurality of different examination dates as in follow-up observation. A plurality of examinations on different examination dates are treated as, for example, different examinations. A plurality of examination images captured on different examination dates are stored for each examination date. As such, the image storage server 3 stores the latest (current) examination image and the past examination image for the same type of examination, in addition to different types of examination images for the same patient. In the present disclosure, a plurality of examination images acquired by performing the same type of examination on the same patient on different examination dates are an example of an "image group".

In the present disclosure, a three-dimensional image is a set of a plurality of slice images (tomographic images) output by a tomography apparatus, such as a CT apparatus or an MRI apparatus, and is also referred to as volume data. Further, in the present disclosure, volume data acquired by one imaging operation is also referred to as the "image group". In this embodiment, each of the plurality of slice images included in the image group is an example of the examination image.

Further, each examination image includes accessory information, such as a DICOM tag, in addition to an image data body. The accessory information includes information, such as image identification (ID) for identifying each image, a patient ID for identifying an object, an examination ID for identifying an examination, an examination date when the examination image is generated, an examination time, the type of the imaging apparatus 2 used in the examination for acquiring the examination image, patient information including the name, age, and sex of a patient, an examination part (imaging part), and imaging conditions (whether or not a contrast agent is used or the dose of radiation).

In the technology of the present disclosure, the accessory information also includes information of an ID number of a region designated as a region of interest in the examination image in a case in which a user, such as a radiologist, interprets the examination image. As the ID number, a different number is given to each region of interest. In addition, in a case in which the same patient ID is given and there are a plurality of images of the same examination part captured in different imaging directions, regions of interest designated at the same position in the object among the regions of interest in each image are set as corresponding regions of interest between the images and ID numbers are given to the corresponding regions of interest so as to be associated with each other.

Figure 2:
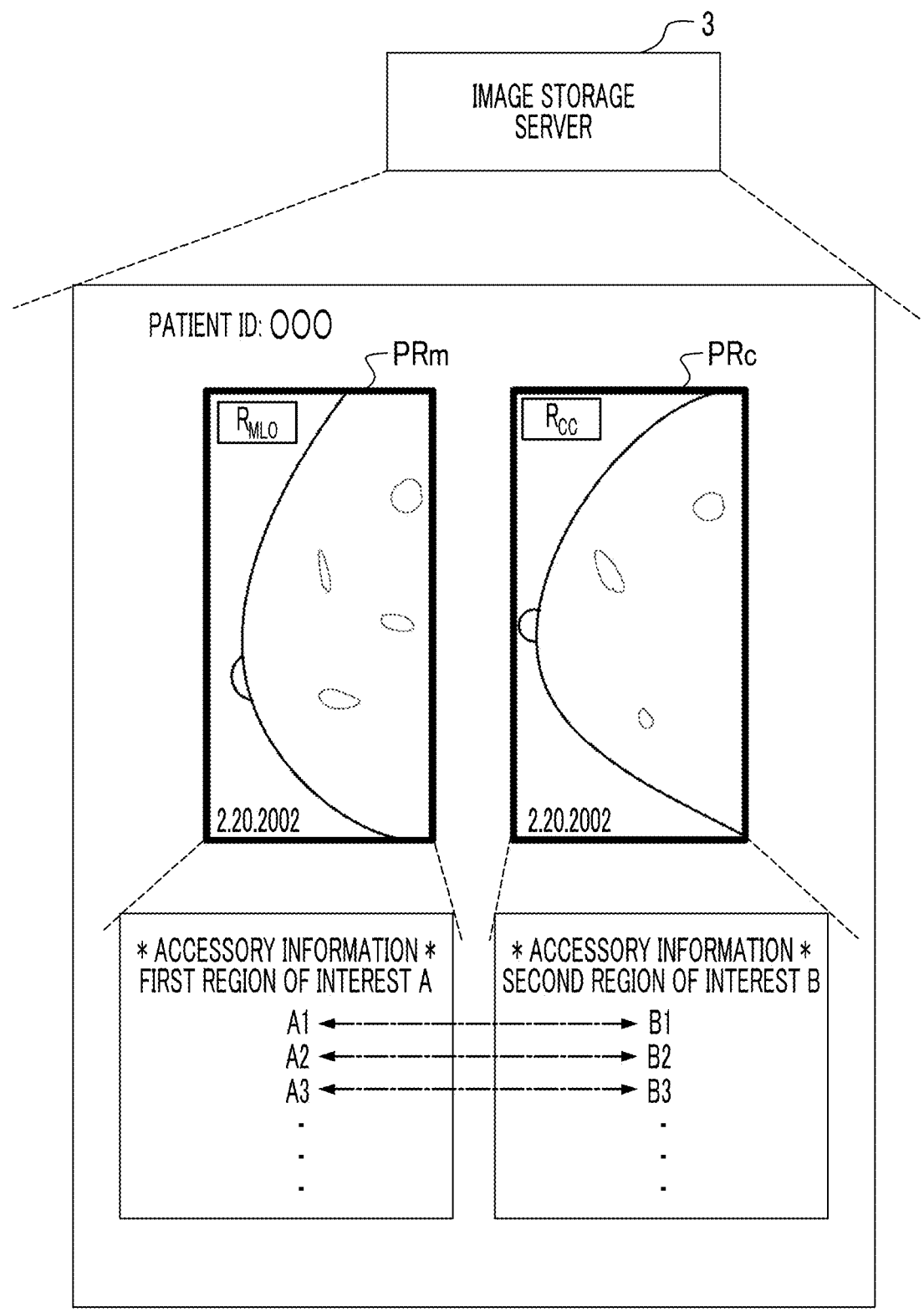
FIG. 2 is a diagram illustrating examination images and accessory information.

Specifically, as illustrated in FIG. 2, in a case in which first and second images of a certain patient are described as an MLO image PRm and a CC image PRc, respectively, the correspondence between the ID numbers of the regions of interest is as follows. Here, the MLO image PRm and the CC image PRc are the breast images of the right breast. The MLO image PRm is a breast image obtained by sandwiching the breast in an oblique direction and capturing the image of the breast in the sandwiching direction and the CC image is a breast image obtained by sandwiching the breast in the vertical direction and capturing the image of the breast in the sandwiching direction.

In FIG. 2, it is assumed that a region of interest of the MLO image PRm is a first region of interest A and a region of interest of the CC image PRc is a second region of interest B. As the first regions of interest A, there are a plurality of first regions of interest A1, A2, A3, and . . . . The reference numerals A1, A2, A3, and . . . are combinations of "A" indicating the first region of interest and identification numbers (1, 2, 3, and . . . ) for identifying each of the first regions of interest. Similarly, as the second regions of interest B, there are a plurality of second regions of interest B1, B2, B3, and . . . and the meaning of the reference numerals B1, B2, B3, and . . . are the same as that of the first regions of interest. For the identification numbers, the same identification number is given to the regions of interest located at the same position in the object such that the first region of interest A and the second region of interest B correspond to each other. That is, the first region of interest A1 of the MLO image PRm corresponds to the second region of interest B1 of the CC image PRc.

The regions of interest are manually designated in each of the MLO image PRm and the CC image PRc. The user operates an input unit 40 which will be described below to manually designate the region of interest. Specifically, the designation is performed as follows. The user uses the input unit 40 to surround a region in which an abnormal shadow, such as a lesion, is recognized on the examination image displayed on a display unit 30, which will be described below, with a frame. The region surrounded by the frame is designated as the region of interest. The region of interest is not limited to the region surrounded by the frame and may be, for example, a filled-in region.

In this example, the correspondence relationship between the first region of interest A and the second region of interest B designated in the MLO image PRm and the CC image PRc, respectively, is also manually input. The correspondence relationship is input by, for example, giving the same ID number to each of the first region of interest A and the second region of interest B.

The information included in the accessory information also includes positional information indicating the position of each of the first region of interest A and the second region of interest B in the examination images.

Figure 3:
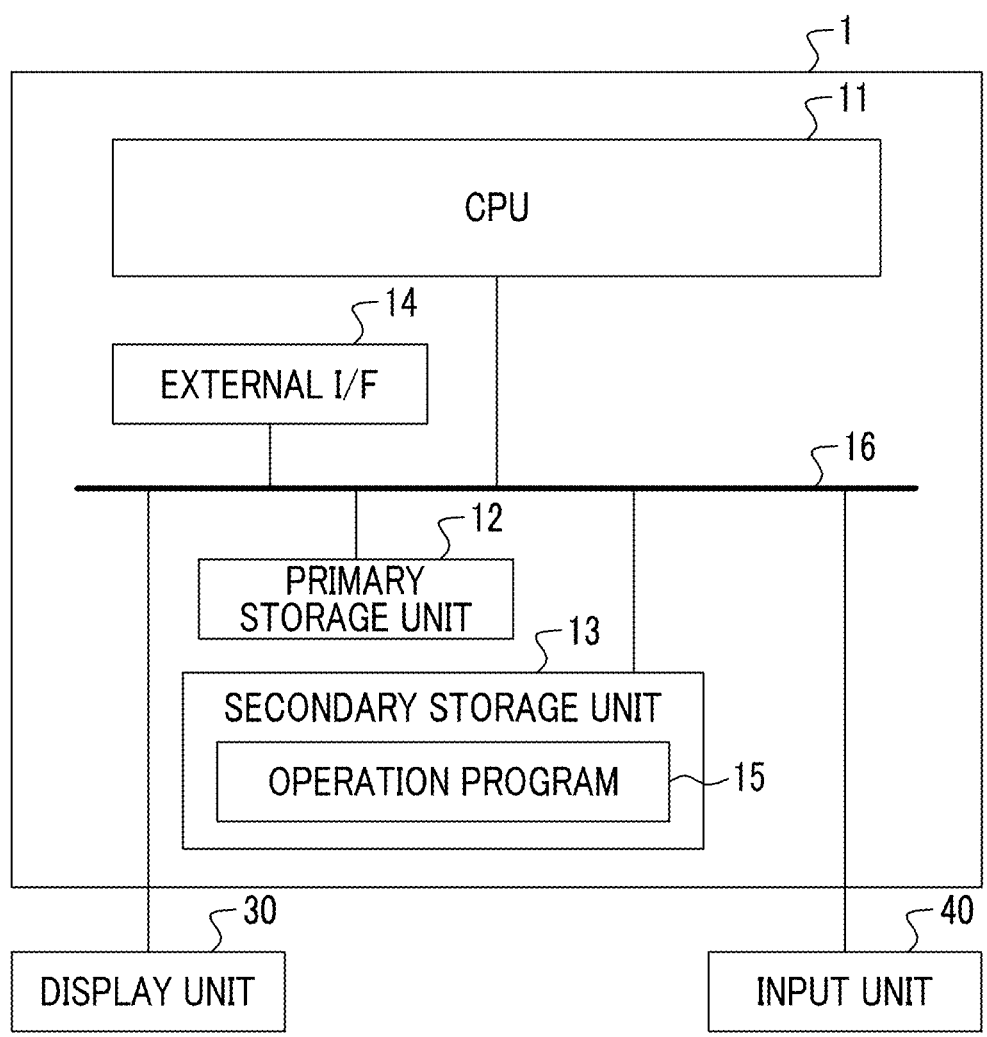
FIG. 3 is a block diagram schematically illustrating a configuration of the display control device according to the embodiment of the present disclosure.

Next, the configuration of the display control device 1 will be described. FIG. 3 is a block diagram illustrating the configuration of the display control device 1 according to an embodiment of the present disclosure and FIG. 4 is a functional block diagram illustrating the display control device 1 according to the first embodiment.

The display control device 1 is a computer comprising, for example, a central processing unit (CPU) 11, a primary storage unit 12, a secondary storage unit 13, and an external interface (I/F) 14. The CPU 11 controls the entire display control device 1. The primary storage unit 12 is a volatile memory that is used as a work area in a case in which various programs are executed. An example of the primary storage unit 12 is a random access memory (RAM). The secondary storage unit 13 is a non-volatile memory in which, for example, various programs and various parameters are stored in advance. An embodiment of an operation program 15 for the display control device 1 according to the present disclosure is installed in the secondary storage unit 13. Since the operation program 15 has a viewer function of displaying an image as a main function, it is also referred to as a viewer program below. An example of the secondary storage unit 13 is a hard disk drive, a solid state drive, or a flash memory.

The operation program 15 is recorded on a recording medium, such as a digital versatile disc (DVD) or a compact disc read only memory (CD-ROM), is distributed, and is then installed in a computer from the recording medium. Alternatively, the operation program 15 may be stored in a storage device of a server computer connected to the network or a network storage such that it can be accessed from the outside, may be downloaded to the computer in response to a request from the outside, and may be installed.

Figure 4:
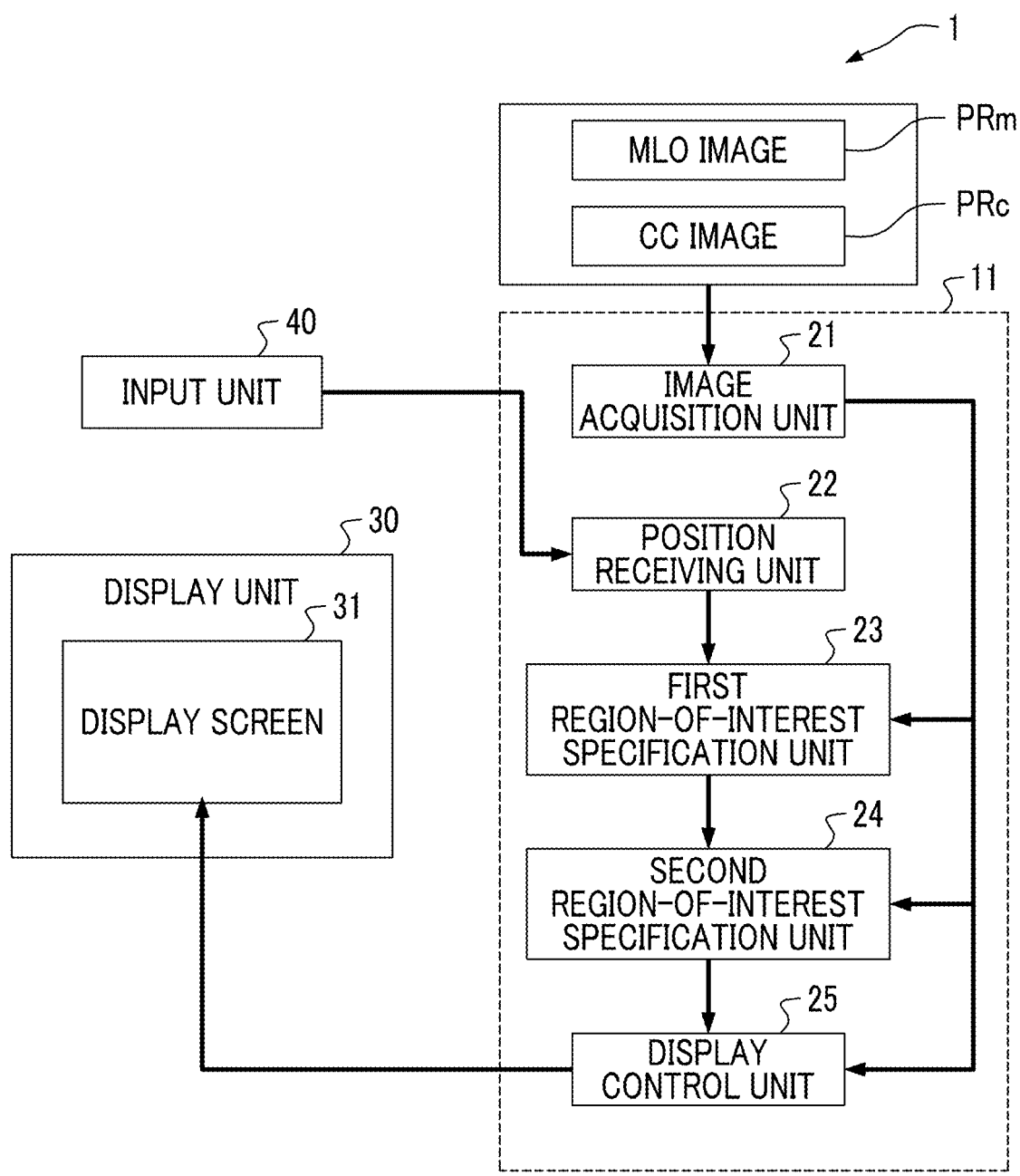
FIG. 4 is a functional block diagram illustrating a display control device according to a first embodiment.

In a case in which the operation program 15 is executed by the CPU 11 such that the CPU 11 functions as an image acquisition unit 21, a position receiving unit 22, a first region-of-interest specification unit 23, a second region-of-interest specification unit 24, and a display control unit 25 illustrated in FIG. 4.

The external I/F 14 transmits and receives various kinds of information between the display control device 1 and the image storage server 3. The CPU 11, the primary storage unit 12, the secondary storage unit 13, and the external I/F 14 are connected to a bus line 16 which is a common path for data exchange.

In addition, the display unit 30 and the input unit 40 are connected to the bus line 16. The display unit 30 is, for example, a liquid crystal display. The display unit 30 displays a display screen (see reference numeral 31 in FIG. 4) on which various regions including an image display region are displayed, which will be described below. The display unit 30 may be a touch panel and may also be used as the input unit 40. The input unit 40 comprises, for example, a mouse and a keyboard and receives various settings input by the user. The input unit 40 according to this embodiment functions as a mouse that inputs an operation of selecting an examination image displayed on the display screen 31 and a mouse that inputs the designation of a position on the examination image displayed on the display screen.

The image acquisition unit 21 acquires an examination image from the image storage server 3 through the external I/F 14. The image acquisition unit 21 acquires the examination image selected by the operation of the input unit 40 by the user. In this embodiment, the image acquisition unit 21 acquires, for example, the MLO image PRm and the CC image PRc acquired by capturing the images of the breast as the examination images as illustrated in FIG. 4. The examination images acquired by the image acquisition unit 21 are displayed on the display screen 31 of the display unit 30.

Figure 5:
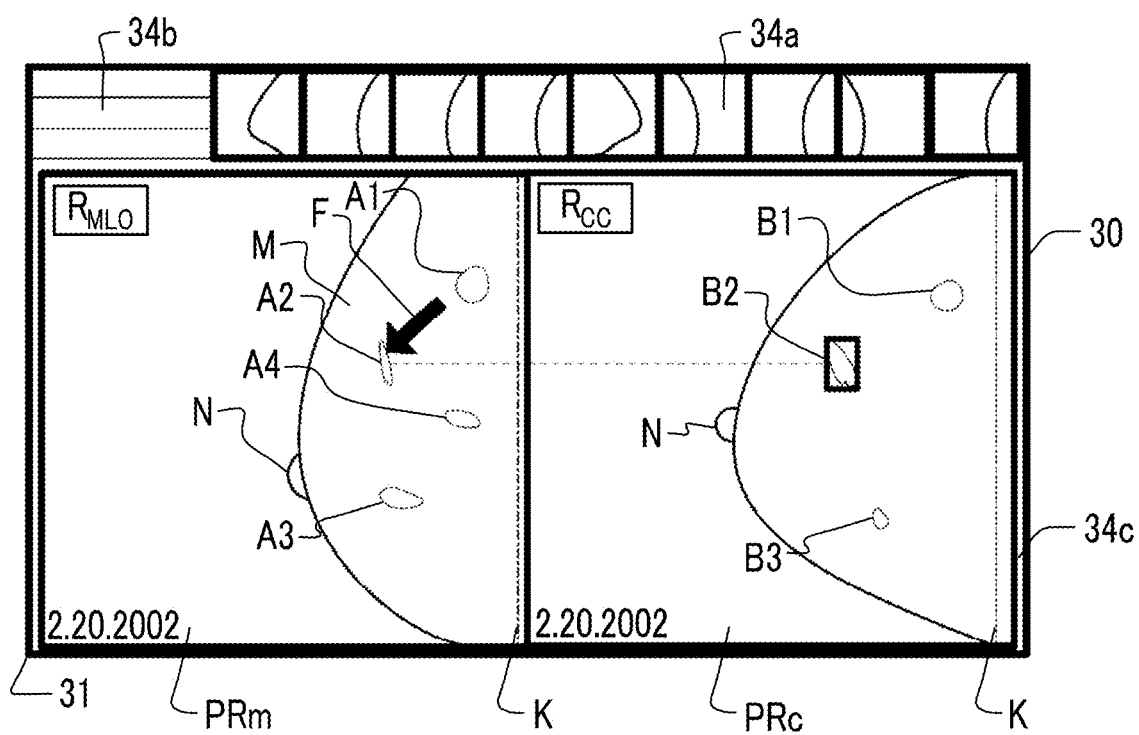
FIG. 5 is a diagram illustrating an example of the display of a display screen on a display unit according to the first embodiment.

Hereinafter, the functions of the display control device 1 will be described on the basis of the functional block illustrated in FIG. 4 and an example of the display screen illustrated in FIG. 5. FIG. 5 is a diagram illustrating an example of the display of the display screen 31 on the display unit 30 according to this embodiment. The display screen 31 is an example of a graphical user interface (GUI)

functioning as an operation screen that displays examination images and various operation portions.

As illustrated in FIG. 5, a thumbnail image display region 34a in which thumbnail images obtained by minifying examination images are displayed is provided on the upper right side of the display screen 31. Further, a selection region 34b is provided on the upper left side of the display screen 31. In the selection region 34b, a patient list in which patient IDs are displayed and an examination list of examinations performed on each patient are displayed so as to be selectable, which is illustrated in brief. An image display region 34c in which examination images are displayed is provided below the thumbnail image display region 34a and the selection region 34b.

For example, in a case in which the user selects the patient ID of a patient as an interpretation target from the patient list, the examination list of the selected patient is displayed. In a case in which the user selects an examination including the examination image to be displayed from the displayed examination list, the thumbnail images of the examination images acquired by the selected examination are displayed in the thumbnail image display region 34a. In a case in which the user selects a thumbnail image corresponding to the examination image to be interpreted from a plurality of thumbnail images displayed in the thumbnail image display region 34a, the image acquisition unit 21 acquires the examination image corresponding to the selected thumbnail image as the examination image selected by the user.

In this embodiment, for example, the display screen 31 is divided into two regions in one row and two columns and the MLO image PRm and CC image PRc illustrated in FIG. 2 are displayed as the examination images in each divided region. Further, as described above, the MLO image PRm corresponds to the first image according to the technology of the present disclosure and the CC image PRc corresponds to the second image according to the technology of the present disclosure.

The display control unit 25 displays the MLO image PRm and the CC image PRc acquired by the image acquisition unit 21 on the display screen 31. Specifically, as illustrated in FIG. 5, the display control unit 25 displays the MLO image PRm in a left region of the image display region 34c and displays the CC image PRc in a right region thereof. Further, the display control unit 25 displays a cursor F indicated by an arrow on the MLO image PRm.

The position receiving unit 22 receives the designation of a position in the MLO image PRm displayed on the display screen 31 by the display control unit 25. Specifically, as illustrated in FIG. 5, the user designates a position by operating, for example, the mouse (input unit 40) to move the cursor F displayed on the MLO image PRm and clicking the mouse at a desired position. The position receiving unit 22 acquires positional information on the MLO image PRm indicated by the tip of the arrow of the cursor F.

The first region-of-interest specification unit 23 specifies the first region of interest A in the MLO image PRm on the basis of the designation of the position received by the position receiving unit 22. For example, it is assumed that ID numbers ID:A1 to ID:A4 are given to each of four first regions of interest A which are designated as the regions of interest in the MLO image PRm in advance by the user as illustrated in FIG. 5 (also see FIG. 2). The first region-of-interest specification unit 23 specifies the first region of interest A closest to the position indicated by the positional information of the cursor F acquired by the position receiving unit 22 from the four first regions of interest A1-A4. That is, a first region of interest A2 is specified as the first region of interest A (a designated first region of interest) in FIG. 5.

The second region-of-interest specification unit 24 specifies a second region of interest B in the CC image PRc which corresponds to the first region of interest A2 (a designated first region of interest) on the basis of the first region of interest A2 specified by the first region-of-interest specification unit 23. For example, it is assumed that ID numbers ID:B1 to ID:B3 are given to each of three second regions of interest B which are designated as the regions of interest in the CC image PRc in advance by the user as illustrated in FIG. 5 (also see FIG. 2). The second region-of-interest specification unit 24 specifies the second region of interest B on the basis of the ID numbers included in the accessory information attached to each of the MLO image PRm and the CC image PRc. Specifically, in a case in which the first region of interest A2 is specified by the first region-of-interest specification unit 23, an ID number in the CC image PRc associated with "ID:A2" which is the ID of the first region of interest A2 is specified. In this embodiment, the ID number "ID:A2" of the first region of interest A2 in the MLO image PRm and the ID number "ID:B2" of the second region of interest B2 in the CC image PRc are associated with each other. Therefore, the second region-of-interest specification unit 24 specifies a second region of interest B2 as the second region of interest B (a designated second region of interest) corresponding to the first region of interest A2.

Further, in this embodiment, in a case in which the position receiving unit 22 receives the designation of a position, the display control unit 25 displays only the second region of interest B2 (a designated second region of interest) corresponding to the first region of interest A2 (a designated first region of interest) specified by the first region-of-interest specification unit 23 such that it is highlighted to be distinguishable from the other second regions of interest B1 and B3 in the CC image PRc. In this embodiment, only the second region of interest B2 is surrounded with a frame to be highlighted. In addition, the user may set the form of the frame, such as the shape and thickness of the frame to any form.

Figure 6:
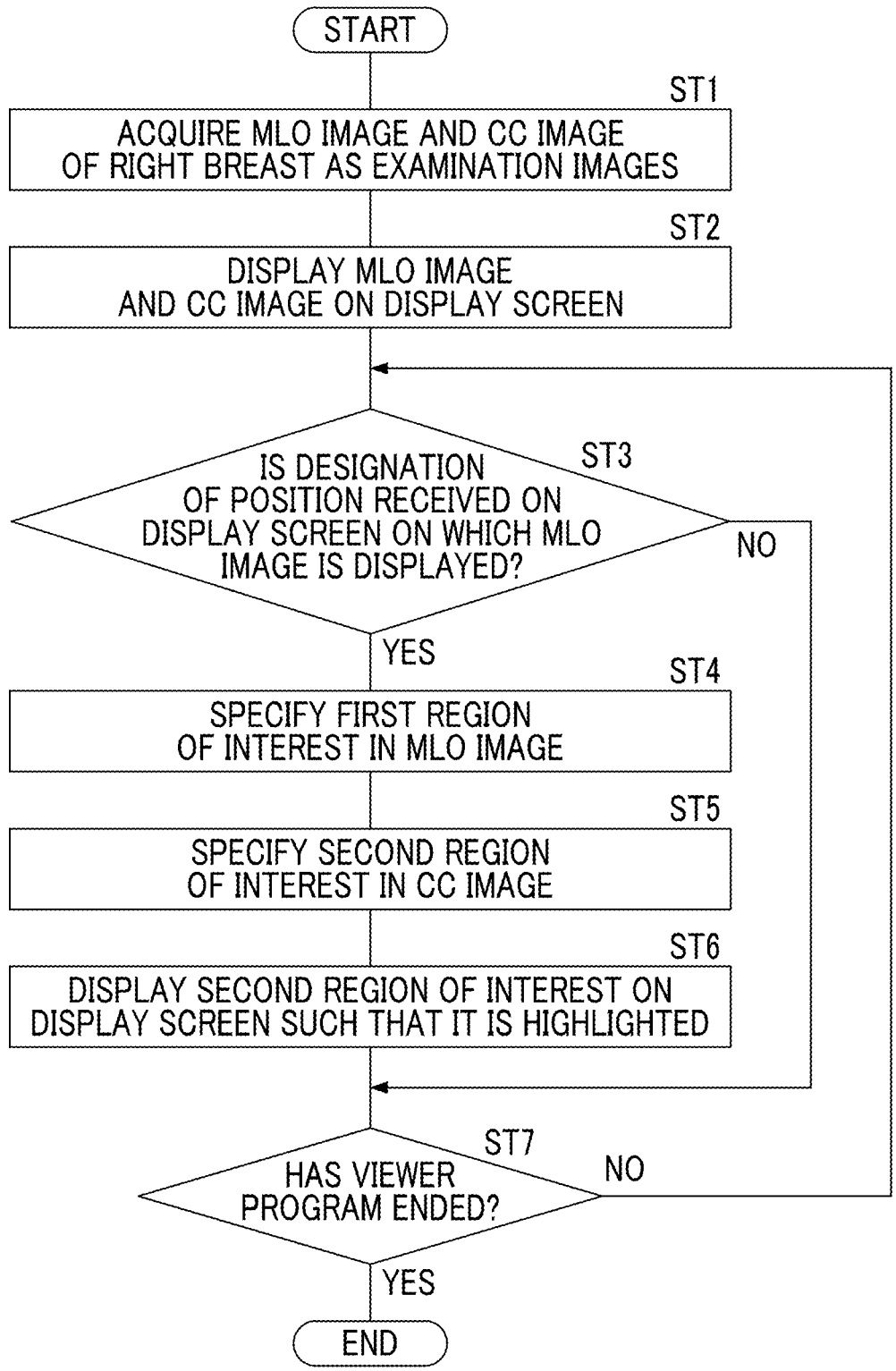
FIG. 6 is a flowchart illustrating a process performed in the first embodiment.

Next, a process performed in this embodiment will be described. FIG. 6 is a flowchart illustrating the process performed in the first embodiment of the present disclosure. In this embodiment, in the display control device 1, in a case in which the CPU 11 starts the viewer program which is the operation program 15 stored in the secondary storage unit 13, the display unit 30 displays the display screen 31.

In a case in which the MLO image PRm and the CC image PRc of the right breast are selected as the examination images to be displayed on the display screen 31, the image acquisition unit 21 acquires the selected MLO image PRm and CC image PRc of the right breast as the examination images (Step ST1). Specifically, as described above, the user uses the input unit 40 to select the name of the patient, whose image is desired to be interpreted, from the patient list and to select a mammography examination as a desired examination from the examination list of the selected patient. Then, the thumbnail images of the breast images acquired by the mammography examination are displayed in the thumbnail image display region 34a. The thumbnail images include the minified images of the MLO images PLm and PRm and the CC images PLc and PRc of the left and right breasts. Here, each of the MLO image PLm and the CC image PLc is the image of the left breast.

In a case in which the user selects a thumbnail image to be displayed from a plurality of thumbnail images displayed in the thumbnail image display region 34a, the image acquisition unit 21 searches for an examination image corresponding to the selected thumbnail image in the image storage server 3 and acquires the examination image. In this embodiment, an example in which the thumbnail images of the MLO image PRm and the CC image PRc of the right breast are selected as the thumbnail images selected by the user will be described. The image acquisition unit 21 acquires the MLO image PRm and the CC image PRc of the right breast corresponding to the selected thumbnail images as the examination images.

Then, the display control unit 25 displays the MLO image PRm and the CC image PRc of the right breast acquired by the image acquisition unit 21 in the image display region 34c of the display screen 31 of the display unit 30 as illustrated in FIG. 5 (Step ST2).

After the MLO image PRm and the CC image PRc are displayed, the position receiving unit 22 monitors whether or not the designation of a position has been received in the MLO image PRm displayed on the display screen 31 (Step ST3). In this embodiment, an example will be described in which four first regions of interest A1 to A4 are present in the MLO image PRm and three second regions of interest B1 to B3 corresponding to the first regions of interest A1 to A3 among the four first regions of interest A1 to A4 are present in the CC image PRc as illustrated in FIG. 5.

In a case in which the monitoring result in Step ST3 is "No" (Step ST3; NO), the CPU 11 advances the process to Step ST7.

In a case in which the monitoring result in Step ST3 is "Yes" (Step ST3; YES), the first region-of-interest specification unit 23 specifies a first region of interest in the MLO image PRm on the basis of the designation of the position received by the position receiving unit 22 (Step ST4). In this embodiment, as illustrated in FIG. 5, position designation is performed at the position where the cursor F indicates the first region of interest A2. The first region-of-interest specification unit 23 specifies the first region of interest A2 according to the designation.

Then, the second region-of-interest specification unit 24 specifies the second region of interest B in the CC image PRc which corresponds to the first region of interest A2 on the basis of the first region of interest A2 specified by the first region-of-interest specification unit 23 (Step ST5). In this embodiment, the ID number "ID:A2" of the first region of interest A2 in the MLO image PRm and the ID number "ID:B2" of the second region of interest B2 in the CC image PRc are associated with each other. Therefore, the second region-of-interest specification unit 24 specifies the second region of interest B2.

Then, the display control unit 25 displays only the second region of interest B2 corresponding to the first region of interest A2 specified by the first region-of-interest specification unit 23 such that it is highlighted to be distinguishable from the other second regions of interest B1 and B3 in the CC image PRc displayed on the display screen 31 (Step ST6).

In Step ST7, the CPU 11 determines whether or not the viewer program has been ended. The viewer program is ended by a command input by the user through the input unit 40. In a case in which the determination result in Step ST7 is "Yes" (Step ST7; YES), the CPU 11 ends the process. On the other hand, in a case in which the determination result in Step ST7 is "No" (Step ST7; NO), the CPU 11 proceeds to a process in Step ST3 and monitors the designation of the position of another first region of interest A. Then, the CPU 11 performs a process in Step ST3 and the subsequent steps. The CPU 11 repeats the series of processes until the viewer program ends.

As described above, according to the first embodiment, in a case in which the designation of a position is received, only the second region of interest B corresponding to the first region of interest A specified by the designation of the position is displayed such that it is highlighted to be distinguishable from the other second regions of interest B in the CC image PRc (an example of the second image). Therefore, in a case in which image diagnosis is performed on the basis of the MLO image PRm (an example of the first image) and the CC image PRc captured in different imaging directions and a plurality of regions of interest are present in each of the MLO image PRm and the CC image PRc, it is possible to understand the correspondence relationship between the first region of interest A and the second region of interest B at a glance.

In particular, the technology of the present disclosure is particularly effective in a case in which a plurality of first regions of interest A are present in the first image and a plurality of second regions of interest B are present in the second image. The reason is as follows. Only the configuration in which the corresponding regions of interest are distinguished from each other regardless of the operation of the user as in the related art causes marks to be displayed for each pair of the corresponding regions of interest in a case in which there are a plurality of pairs of the corresponding regions of interest. In this configuration, in a case in which the number of pairs increases, the number of types of marks also increases, which makes it difficult to distinguish the pairs. According to the technology of the present disclosure, even in a case in which there are a plurality of pairs of the first regions of interest A and the second regions of interest B corresponding to each other, only the second region of interest B corresponding to the first region of interest A designated by the user is displayed to be highlighted. Therefore, it is easy to understand the correspondence relationship between the regions of interest that the user wants to see at a glance.

In the first embodiment, the display control unit 25 surrounds only the second region of interest B2 with a frame to be highlighted as illustrated in FIG. 5 as a method for displaying only the second region of interest B corresponding to the specified first region of interest A such that it is highlighted to be distinguishable from the other second regions of interest B in the CC image PRc, that is, in the second image. However, the technology of the present disclosure is not limited thereto. For example, the frame surrounding the second region of interest B2 may be displayed so as to be blinked and highlighted. Further, for example, the second region of interest B2 may be masked or hatched or the brightness of the second region of interest B2 may be increased such that the second region of interest B2 is highlighted.

Further, in the first embodiment, the example has been described in which the user gives the same ID number to each of the first region of interest A and the second region of interest B to input the correspondence relationship between two regions of interest, that is, the first region of interest A and the second region of interest B corresponding to each other. However, the technology of the present disclosure is not limited thereto. For example, first, in a state in which two images, that is, the MLO image PRm and the CC image PRc are displayed on the display screen, the user is allowed to designate two regions of interest, that is the first and second regions of interest A and B that are determined to correspond to each other by the user among a plurality of first regions of interest A and second regions of interest B included in the MLO image PRm and the CC image PRc. Then, the same ID number is given to the two first and second regions of interest A and B designated by the user. The correspondence relationship may be input by this method.

In addition, in the first embodiment, the second region-of-interest specification unit 24 specifies the second region of interest B corresponding to the specified first region of interest A on the basis of the ID number. However, the technology of the present disclosure is not limited thereto. For example, it is assumed that four first regions of interest A1 to A4 are present in the MLO image PRm and three regions of interest B1 to B3 are present in the CC image PRc as illustrated in FIG. 5. In a case in which the first region-of-interest specification unit 23 specifies the first region of interest A2, the second region-of-interest specification unit 24 can specify the second region of interest B2 on the CC image PRc, which has the closest positional relationship to the first region of interest A2 for a breast M in the MLO image PRm, as the second region of interest corresponding to the first region of interest A2. In other words, this is a method that calculates the region of interest at a close position on the basis of the positional information in the image, using computation. Here, the positional relationship between the breast M and each region of interest in each of the MLO image PRm and the CC image PRc is calculated by, for example, calculating the distance from a reference position, such as a nipple N or a chest wall K, to the center of gravity of the region of interest. As such, the second region-of-interest specification unit 24 can input the correspondence relationship between the first region of interest A and the second region of interest B, instead of the method of manually inputting the ID number.

Further, in the first embodiment, the case has been described in which a plurality of first regions of interest A are present in the first image as an example of the MLO image PRm and a plurality of second regions of interest B are present in the second image as an example of the CC image PRc as illustrated in FIG. 5. However, the technology of the present disclosure is not limited thereto. As illustrated in FIGS. 7 to 10, a plurality of regions of interest (the first regions of interest A or the second regions of interest B) may be present in at least one of the first image or the second image and only one region of interest may be present in the other image.

Figure 7:
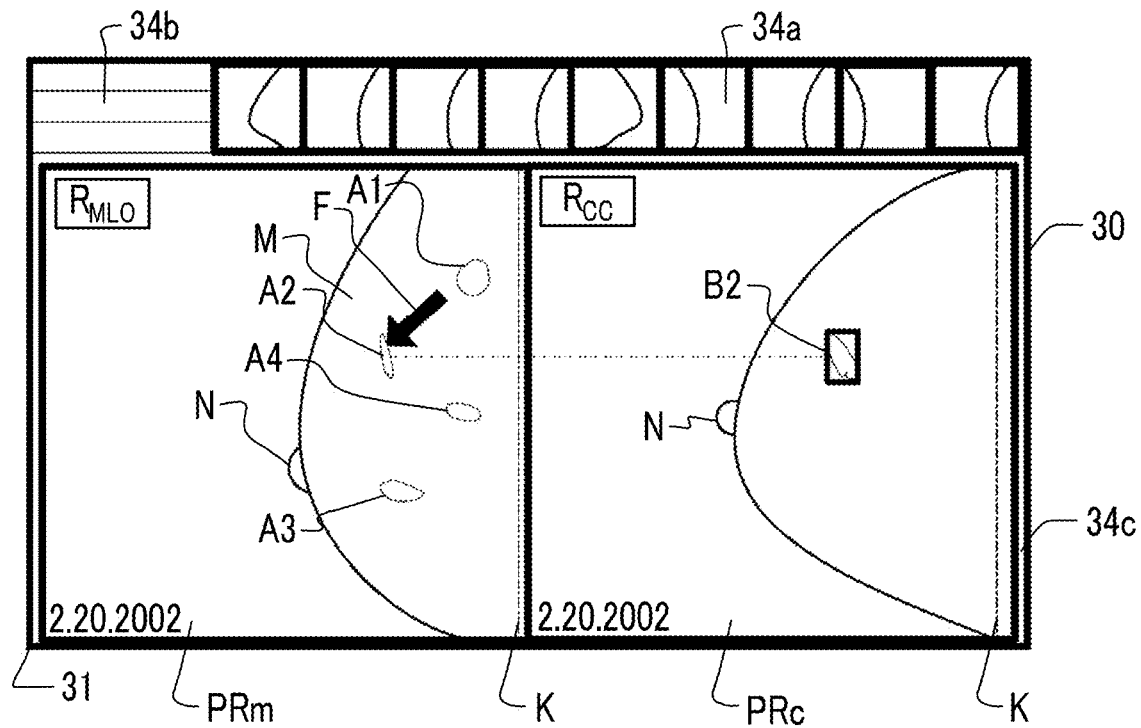
FIG. 7 is a diagram illustrating an example of the display of the display screen on the display unit according to the first embodiment.
Figure 8:
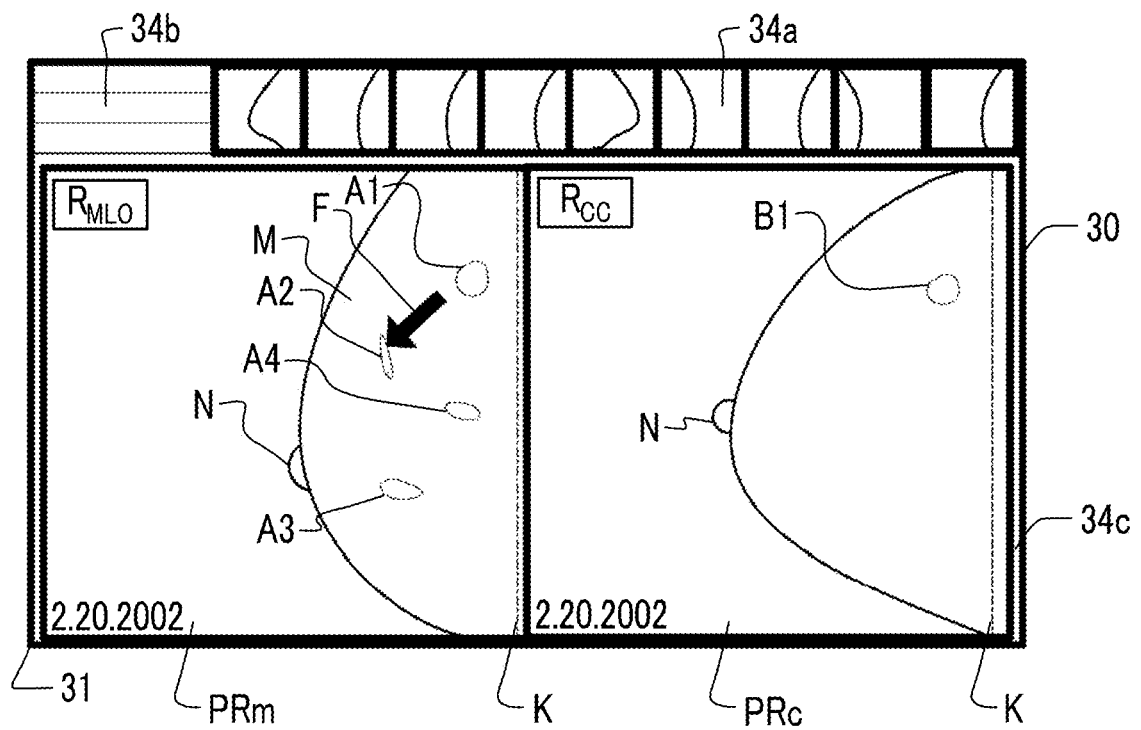
FIG. 8 is a diagram illustrating an example of the display of the display screen on the display unit according to the first embodiment.

FIGS. 7 and 8 illustrate examples in which a plurality of first regions of interest A1 are present in the MLO image PRm which is an example of the first image and only one second region of interest B is present in the CC image PRc which is an example of the second image.

In the example illustrated in FIG. 7, a plurality of first regions of interest A (A1 to A4) are present in the MLO image PRm and only one second region of interest B (B2) is present in the CC image PRc. In this case, for example, it is assumed that position designation is performed at the position where the cursor F indicates the first region of interest A2 as illustrated in FIG. 7. In the example illustrated in FIG. 7, since the ID number "ID:A2" of the first region of interest A2 in the MLO image PRm and the ID number "ID:B2" of the second region of interest B2 in the CC image PRc are associated with each other, the second region-of-interest specification unit 24 specifies the second region of interest B2. The display control unit 25 displays the second region of interest B2 corresponding to the first region of interest A2 specified by the first region-of-interest specification unit 23 so as to be highlighted.

FIG. 8 illustrates a case in which the second region of interest corresponding to the first region of interest A designated in the MLO image PRm is absent in the CC image PRc. In the example illustrated in FIG. 8, the second region of interest B in the CC image PRc is only one second region of interest B1 with the ID number "ID:B1". In the example illustrated in FIG. 8, in a case in which the first region of interest A2 is designated in the MLO image PRm as in FIG. 7, the second region of interest B2 corresponding to the first region of interest A2 is absent in the CC image PRc. Therefore, since there is no second region of interest B corresponding to the first region of interest A2 specified by the first region-of-interest specification unit 23, the display control unit 25 does not perform highlighting.

As such, in a case in which the second region of interest B corresponding to the first region of interest A designated by the user is present as illustrated in FIG. 7, highlighting is performed. However, in a case in which the corresponding second region of interest B is absent as illustrated in FIG. 8, of course, highlighting is not performed. Therefore, it is easy to understand the correspondence relationship between the first region of interest A and the second region of interest B (specifically, whether or not the second region of interest B corresponding to the first region of interest A designated by the user is present) at a glance on the basis of the operation of the user.

Figure 9:
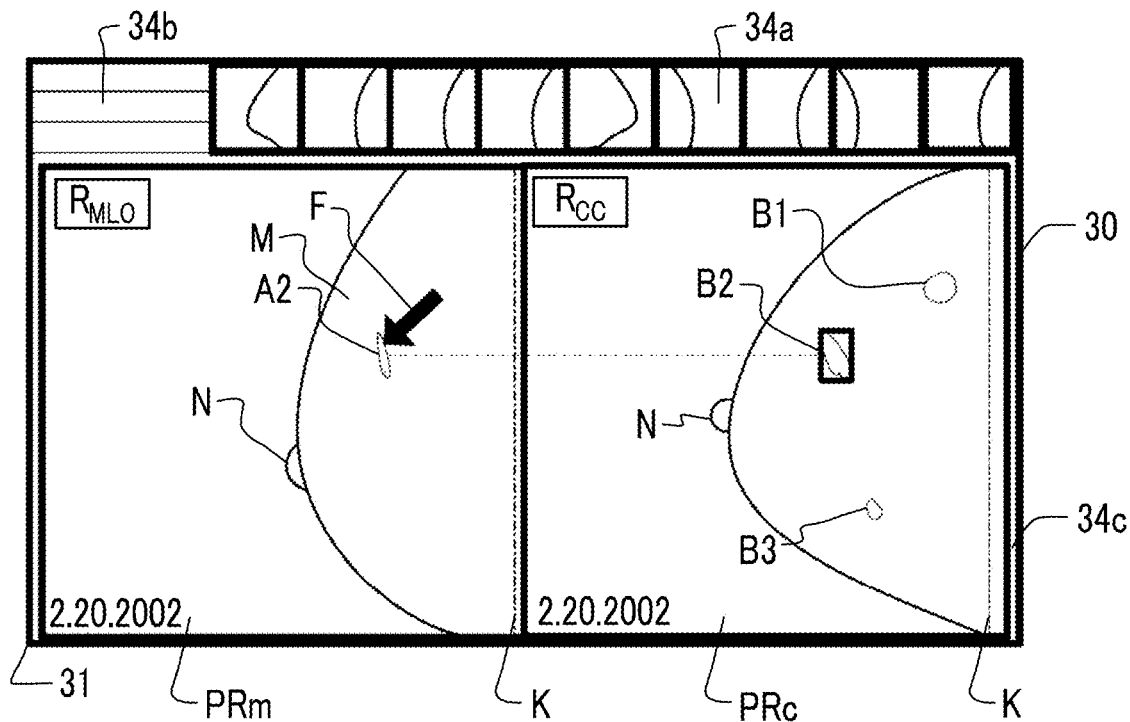
FIG. 9 is a diagram illustrating an example of the display of the display screen on the display unit according to the first embodiment.

In contrast to the examples illustrated in FIGS. 7 and 8, in the example illustrated in FIG. 9, only one first region of interest A is present in the MLO image PRm (an example of the first image) and a plurality of second regions of interest B are present in the CC image PRc (an example of the second image). In this case, for example, it is assumed that position designation is performed at the position where the cursor F indicates the first region of interest A2 as illustrated in FIG. 9. In the example illustrated in FIG. 9, the second region of interest B2 with the ID number "ID:B2" corresponding to the first region of interest A2 in the MLO image PRm is present in the CC image PRc. Therefore, the second region-of-interest specification unit 24 specifies the second region of interest B2. The display control unit 25 displays the second region of interest B2 corresponding to the first region of interest A2 specified by the first region-of-interest specification unit 23 so as to be highlighted.

In a case in which the first region of interest A present in the MLO image PRm is not the first region of interest A2 and only the first region of interest A1 is present in FIG. 9, even though the first region of interest A1 is designated, the display control unit 25 does not perform highlighting since the second region of interest B1 with the ID number "ID:B1" corresponding to the first region of interest A1 is absent in the CC image PRc, which is not illustrated.

As such, in a case in which the second region of interest B corresponding to the first region of interest A designated by the user is present as illustrated in FIG. 9, highlighting is performed. However, in a case in which the corresponding second region of interest A is absent, highlighting is not performed, which is not illustrated. Therefore, it is easy to understand the correspondence relationship between the first region of interest A and the second region of interest B (specifically, whether or not the second region of interest B corresponding to the first region of interest A designated by the user is present) at a glance on the basis of the operation of the user.

In addition, there is a case in which only one first region of interest A is present in the MLO image PRm and only one second region of interest B is present in the CC image PRc. In a case in which the first region of interest A is designated, the corresponding second region of interest B may be displayed so as to be highlighted or so as not to be highlighted. The reason is that, in a case in which only one first region of interest A and only one second region of interest B are present, the correspondence relationship is relatively clear even though highlighting is not performed.

Figure 10:
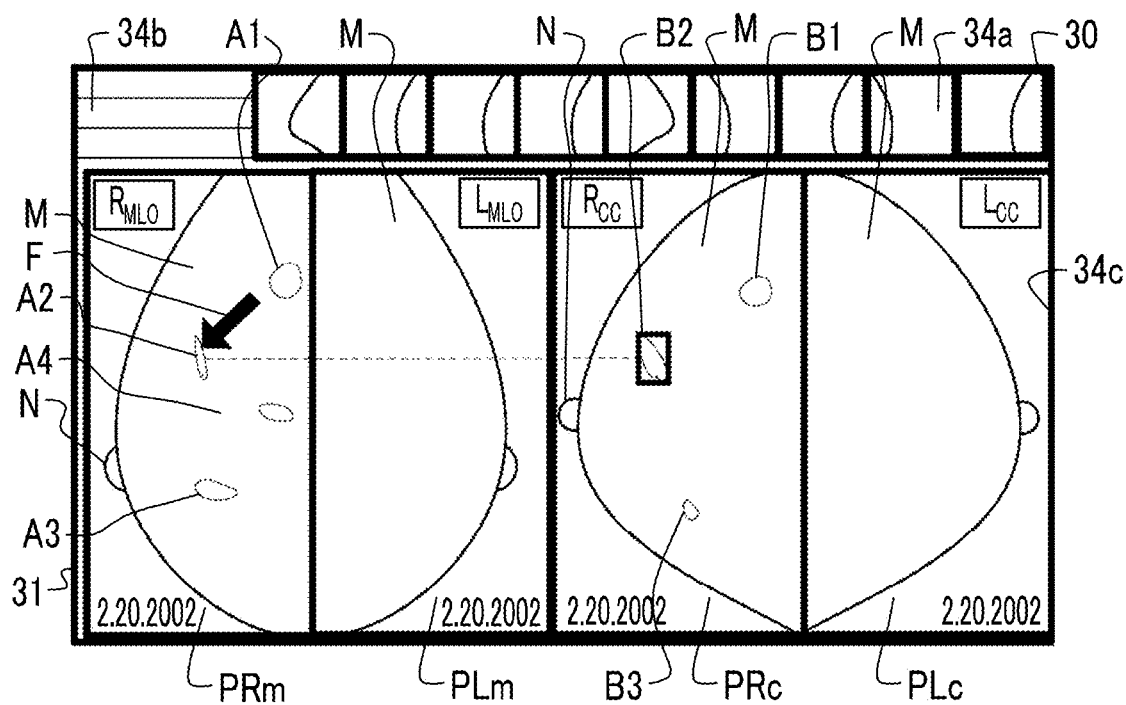
FIG. 10 is a diagram illustrating Modification Example 1 of the display of the display screen on the display unit according to the first embodiment.

FIGS. 10 to 17 illustrate various modification examples. In the first embodiment, the image acquisition unit 21 acquires the MLO image PRm and the CC image PRc obtained by capturing the images of the right breast in different imaging directions using the mammography apparatus and the display control unit 25 displays the MLO image PRm and the CC image PRc on the display screen 31 of the display unit 30. However, the technology of the present disclosure is not limited thereto. FIG. 10 is a diagram illustrating Modification Example 1 of the display of the display screen 31 on the display unit 30 according to the first embodiment. The image acquisition unit 21 may acquire the MLO images PRm and PLm and the CC images PRc and PLc obtained by capturing the images of the left and right breasts in different imaging directions and the display control unit 25 may display the MLO images PRm and PLm and the CC images PRc and PLc on the display screen 31 of the display unit 30. In this case, the MLO image PRm and the MLO image PLm correspond to the first image according to the present disclosure, and the CC image PRc and the CC image PLc correspond to the second images according to the present disclosure. FIG. 10 illustrates an aspect in which the first regions of interest A1 to A4 and the second regions of interest B1 to B3 are present only in the right breast. However, in some cases, the first regions of interest and the second regions of interest are present in the left breast. In this case, the technique described in the first embodiment can be applied to both the left and right breasts.

Figure 11:
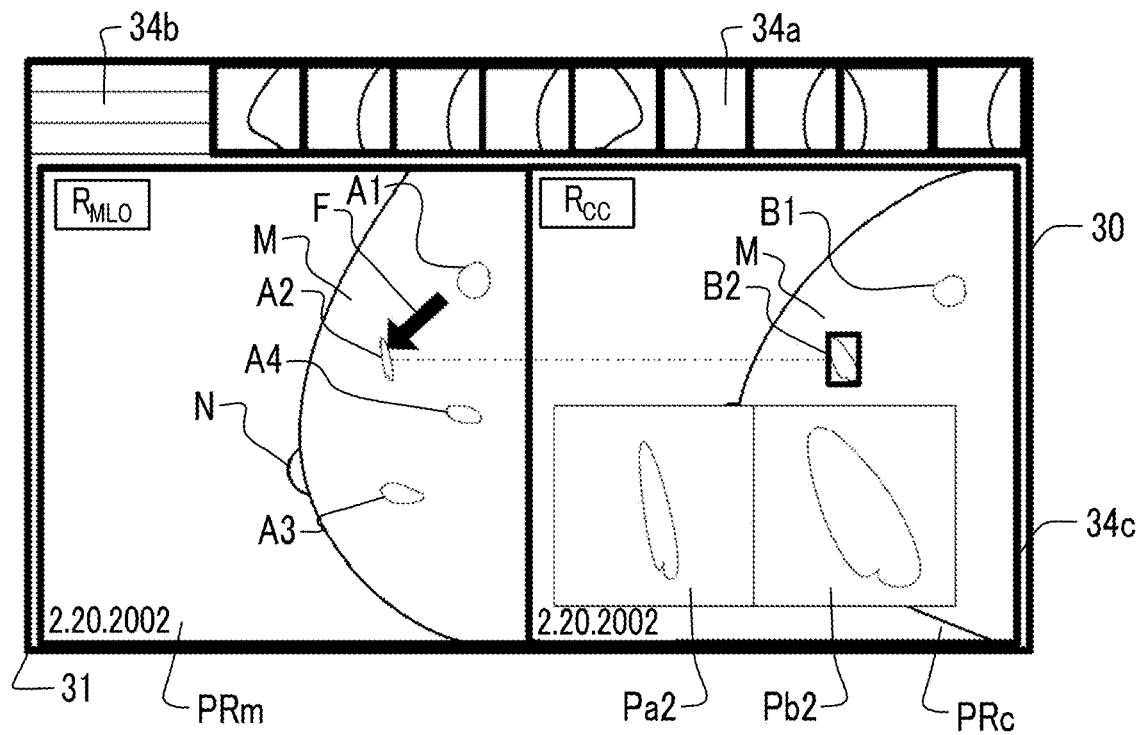
FIG. 11 is a diagram illustrating Modification Example 2 of the display of the display screen on the display unit according to the first embodiment.

FIG. 11 is a diagram illustrating Modification Example 2 of the display of the display screen 31 on the display unit 30 according to the first embodiment. In addition to the display aspect described in FIG. 5 in the first embodiment, the display control unit 25 displays an enlarged image Pa2 of the first region of interest A2 specified by the first region-of-interest specification unit 23 and an enlarged image Pb2 of the second region of interest B2 which is specified by the second region-of-interest specification unit 24 and corresponds to the first region of interest A2 which is specified by the second region-of-interest specification unit 24 so as to be superimposed on the CC image PRc. The enlarged images Pa2 and Pb2 are displayed at positions that are not superimposed on the specified first region of interest A2 and the specified second region of interest B2.

As a result, the user can observe the first region of interest A2 based on the position designated by the cursor F and the second region of interest B2 corresponding to the first region of interest A2 in detail in the enlarged images Pa2 and Pb2. In this example, the enlarged images Pa2 and Pb2 are displayed on the CC image PRc. However, the present disclosure is not limited thereto. For example, the enlarged images Pa2 and Pb2 may be displayed on the MLO image PRm or may be displayed at any positions on the display screens 31. The enlarged images Pa2 and Pb2 may not be displayed in parallel, but may be displayed in series. In addition, the layout may be changed appropriately.

Figure 12:
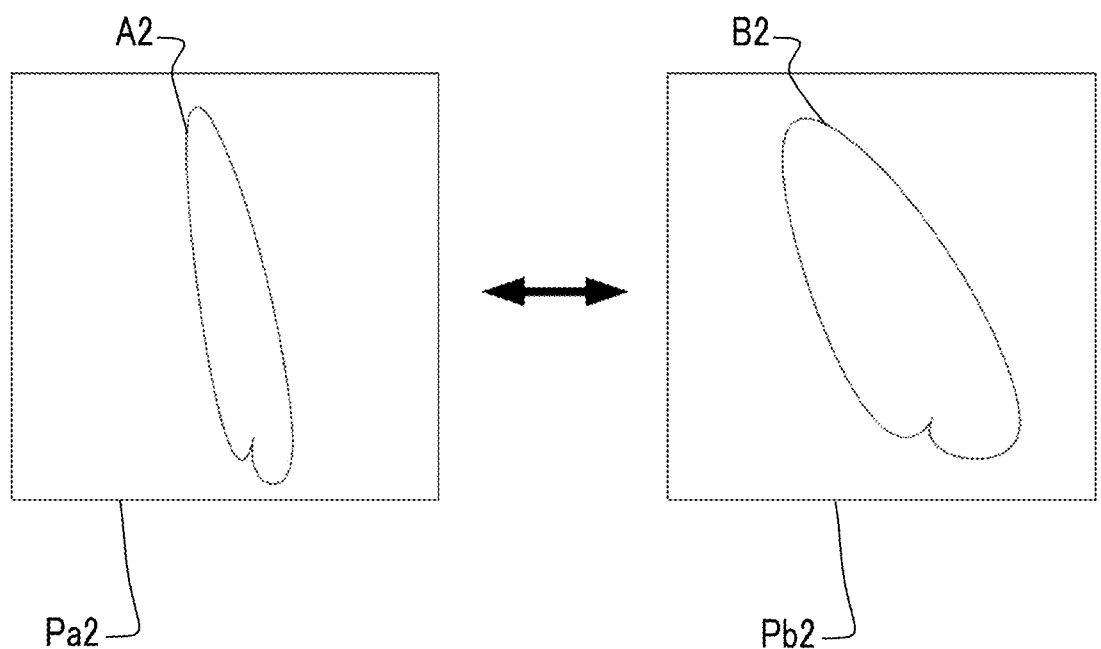
FIG. 12 is a diagram illustrating an example of the enlarged display of a region of interest.

FIG. 12 is a diagram illustrating an example of the enlarged display of the region of interest. For example, as illustrated in FIG. 12, the enlarged image Pa2 and the enlarged image Pb2 may be displayed on the display screen 31 so as to be switched at a predetermined time interval. In this case, the enlargement ratio and the cut-out position of the image are set such that the coordinate positions of the first region of interest A2 and the second region of interest B2 in the enlarged image Pa2 and the enlarged image Pb2 are more matched with each other. As such, in a case in which the enlarged image Pa2 and the enlarged image Pb2 are displayed so as to be switched, it is easy to compare the first region of interest A2 and the second region of interest B2.

Figure 13:
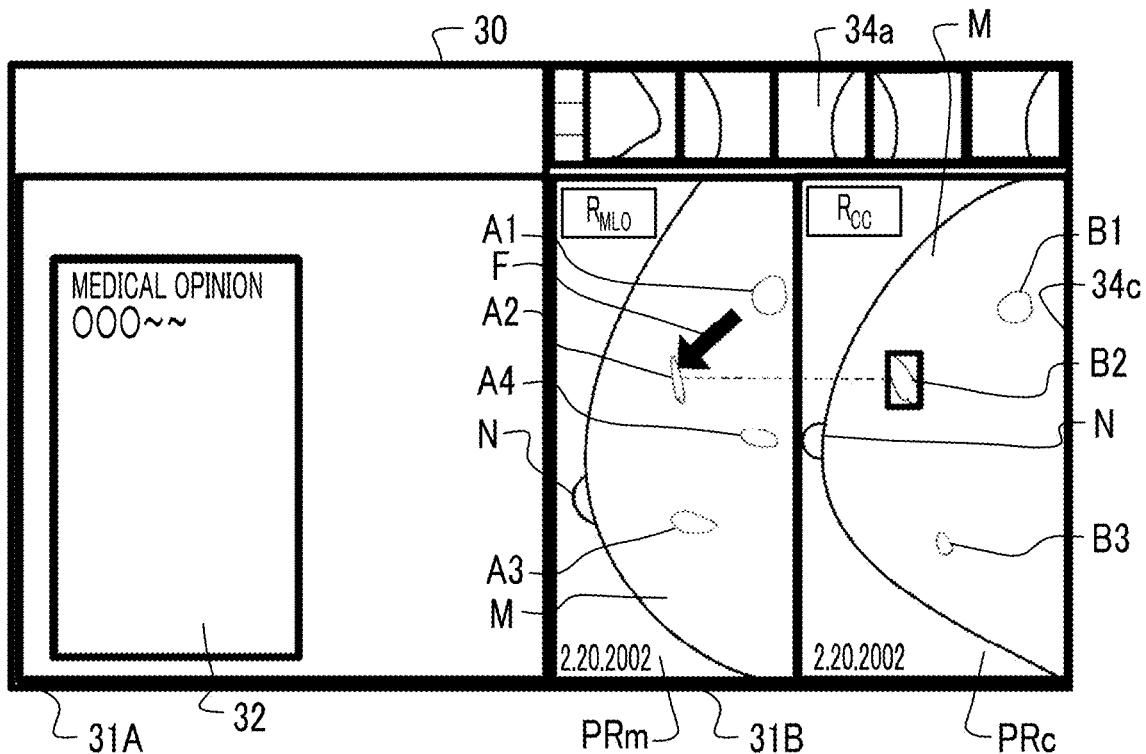
FIG. 13 is a diagram illustrating Modification Example 3 of the display of the display screen on the display unit according to the first embodiment.

FIG. 13 is a diagram illustrating Modification Example 3 of the display of the display screen 31 on the display unit 30 according to the first embodiment. In Modification Example 3, as illustrated in FIG. 13, the display unit 30 has a first display screen 31A and a second display screen 31B. The display control unit 25 displays an image interpretation report 32 in which the content of image diagnosis is recorded on the first display screen 31A and displays images on the second display screen 31B. The second display screen 31B functions as an image viewer on which images are displayed. In Modification Example 3, the display control unit 25 displays the content displayed on the display screen 31 illustrated in FIG. 5 in the first embodiment on the second display screen 31B. According to Modification Example 3, in a case in which image diagnosis is performed on the basis of the MLO image PRm and the CC image PRc captured in different imaging directions, the user can understand the correspondence relationship between the first region of interest in the MLO image PRm and the second region of interest in the CC image PRc at a glance while checking the content of the image interpretation report 32.

Figure 14:
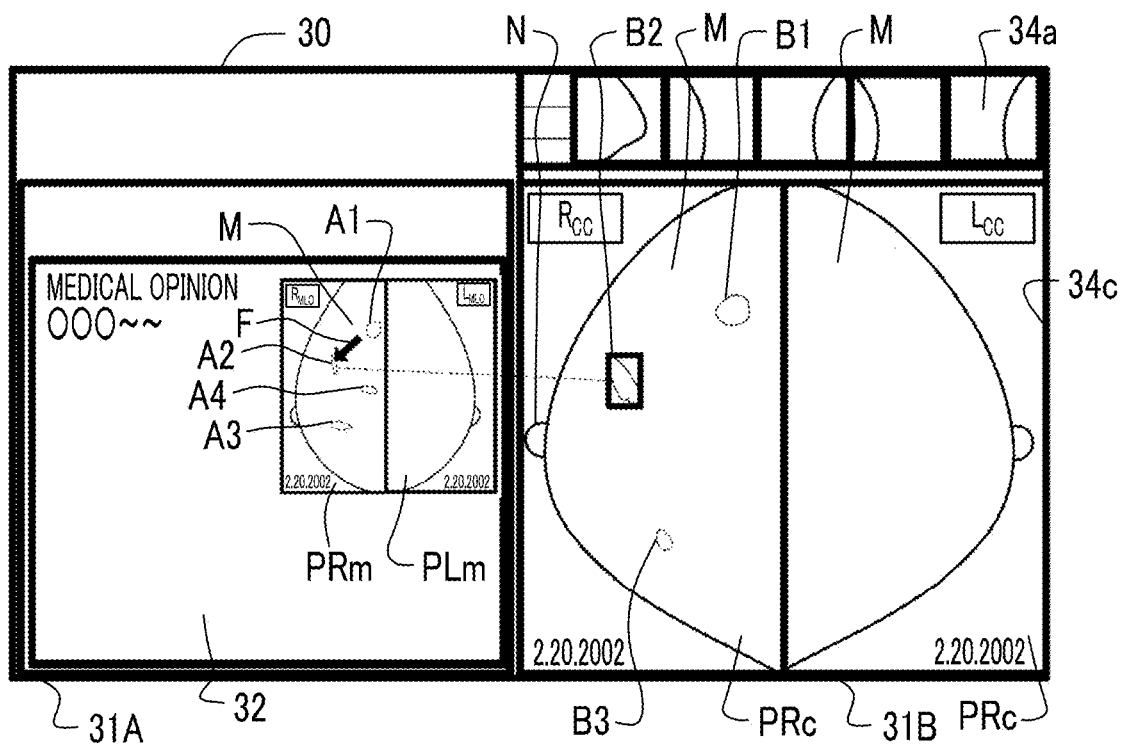
FIG. 14 is a diagram illustrating Modification Example 4 of the display of the display screen on the display unit according to the first embodiment.

FIG. 14 is a diagram illustrating Modification Example 4 of the display of the display screen 31 of the display unit 30 according to the first embodiment. In Modification Example 4, as illustrated in FIG. 14, the display unit 30 has a first display screen 31A and a second display screen 31B. An image interpretation report 32 in which the content of image diagnosis is recorded is displayed on the first display screen 31A and images are displayed on the second display screen 31B. The second display screen 31B functions as an image viewer on which images are displayed. In Modification Example 4, the image interpretation report 32 displayed on the first display screen 31A includes the MLO image PRm and the MLO image PLm obtained by capturing the images of the left and right breasts. In Modification Example 4, the MLO image PRm and the MLO image PLm included in the image interpretation report 32 correspond to the first images according to the present disclosure.

In Modification Example 4, the CC image PRc and the CC image PLc obtained by capturing the images of the left and right breasts are displayed on the second display screen 31B. In Modification Example 4, the CC image PRc and the CC image PLc displayed on the second display screen 31B correspond to the second images according to the present disclosure. In Modification Example 4, the CC image PRc and the CC image PLc displayed on the second display screen 31B are examination images to be interpreted and are high-resolution images having a relatively high resolution. In contrast, the MLO image PRm and the MLO image PLm included in the image interpretation report 32 displayed on the first display screen 31A are low-resolution images having a lower resolution than the CC image PRc and the CC image PLc displayed on the second display screen 31B.

According to Modification Example 4, in a case in which the user designates the desired first region of interest A (the first region of interest A2 in FIG. 14) in the MLO image PRm and the MLO image PLm (examples of the first image)

included in the image interpretation report 32, the second region of interest B2 corresponding to the first region of interest A2 is displayed such that it is highlighted to be distinguishable from the other second regions of interest B1 and B3 in the CC image PRc and the CC image PLc (an example of the second images) which have been captured in different imaging directions from the MLO image PRm and the MLO image PLm and displayed on the second display screen 31B. Therefore, the user can designate the desired first region of interest A in the image interpretation report 32 to understand the correspondence relationship between the first region of interest A in the MLO images PRm and PLm and the second region of interest B in the CC images PRc and PLc at a glance between the image interpretation report 32 and the image viewer (second display screen 31B).

Figure 15:
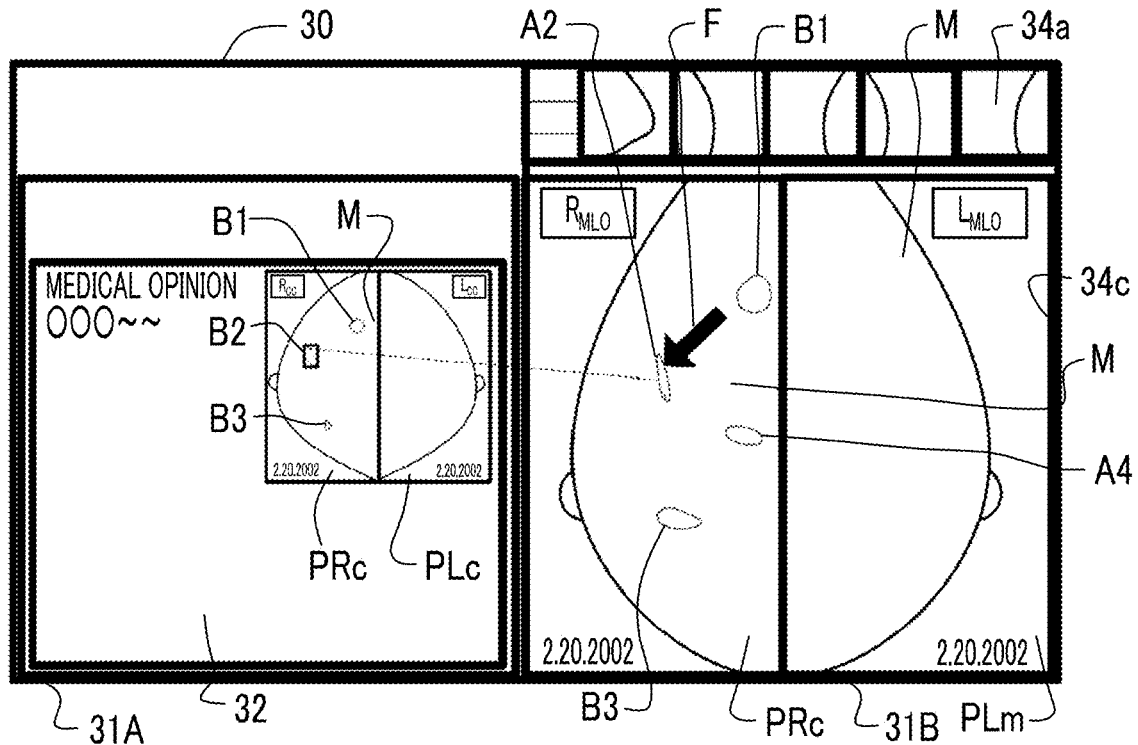
FIG. 15 is a diagram illustrating Modification Example 5 of the display of the display screen on the display unit according to the first embodiment.

In Modification Example 4, the MLO image PRm and the MLO image PLm included in the image interpretation report 32 correspond to the first images according to the present disclosure and the CC image PRc and the CC image PLc displayed on the second display screen 31B correspond to the second images according to the present disclosure. However, the technology of the present disclosure is not limited thereto. FIG. 15 is a diagram illustrating Modification Example 5 of the display of the display screen 31 on the display unit 30 according to the first embodiment. In Modification Example 5, as illustrated in FIG. 15, the CC image PRc and the CC image PLc included in the image interpretation report 32 correspond to the second images according to the present disclosure and the MLO image PRm and the MLO image PLm displayed on the second display screen 31B correspond to the first images according to the present disclosure.

That is, in a case in which the desired first region of interest A2 is designated in the MLO image PRm and the MLO image PLm displayed on the second display screen 31B, the second region of interest B2 corresponding to the first region of interest A2 is displayed such that it is highlighted to be distinguishable from the other second regions of interest B1 and B3 in the CC image PRc and the CC image PLc which have been captured in different imaging directions from the MLO image PRm and the MLO image PLm and included in the image interpretation report 32. Therefore, the user can designate the desired first region of interest on the image viewer (second display screen 31B) to understand the correspondence relationship between the first region of interest A in the MLO images PRm and PLm and the second region of interest B in the CC images PRc and PLc at a glance between the image interpretation report 32 and the image viewer.

in Modification Examples 4 and 5, the image included in the image interpretation report 32 is a low-resolution image. However, the technology of the present disclosure is not limited thereto. The image may be an examination image having the same resolution as the examination image displayed on the second display screen 31B.

Figure 16:
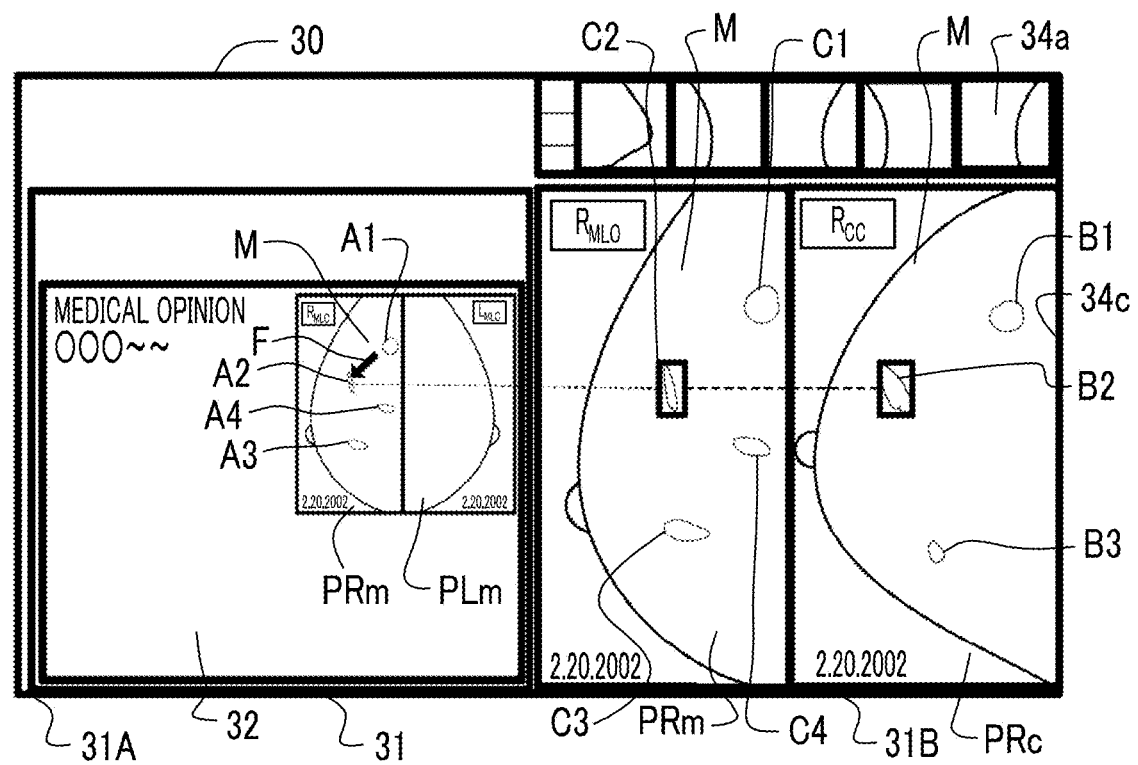
FIG. 16 is a diagram illustrating Modification Example 6 of the display of the display screen on the display unit according to the first embodiment.

FIG. 16 is a diagram illustrating Modification Example 6 of the display of the display screen 31 on the display unit 30 according to the first embodiment. In Modification Example 6, as illustrated in FIG. 16, the display unit 30 has a first display screen 31A and a second display screen 31B. An image interpretation report 32 including an MLO image PRm and an MLO image PLm obtained by capturing the images of the left and right breasts is displayed on the first display screen 31A. An MLO image PRm and a CC image PRc captured on the same examination date as the MLO image PRm and the MLO image PLm displayed on the first display screen 31A are displayed on the second display screen 31B.

In Modification Example 6, the MLO image PRm and the MLO image PLm included in the image interpretation report 32 correspond to the first images according to the present disclosure. Further, the CC image PRc and the MLO image PRm displayed on the second display screen 31B correspond to the second image and a third image according to the present disclosure, respectively.

In Modification Example 6, in a case in which the user designates, for example, the first region of interest A2 as the desired first region of interest A in the MLO image PRm and the MLO image PLm included in the image interpretation report 32, the second regions of interest B2 and C2 corresponding to the first region of interest A2 are displayed such that they are highlighted to be distinguishable from the other second regions of interest B1, C1, B3, and C3 in two images, that is, the MLO image PRm and the CC image PRc displayed on the second display screen 31B. That is, in Modification Example 6, in a case in which one first region of interest A is designated in the first image, the second regions of interest B and C corresponding to the first region of interest A are displayed so as to be highlighted in two images, that is, the second and third images different from the first image.

In Modification Example 6, in a case in which the user designates the desired first region of interest A on the MLO image PRm included in the image interpretation report 32, the MLO image PRm and the CC image PRc of the right breast are displayed on the second display screen 31B. However, for example, in a case in which the user designates the desired first region of interest A on the MLO image PLm included in the image interpretation report 32, the display control unit 25 displays the MLO image PLm and the CC image PLc of the left breast, instead of the MLO image PRm and the CC image PRc displayed on the second display screen 31B, such that the second regions of interest B and C on the MLO image PLm and the CC image PLc are highlighted.

In Modification Example 6, the MLO image PRm of the right breast which is the third image displayed on the second display screen 31B is an image captured in the same imaging direction as the MLO image PRm included in the image interpretation report 32. However, the technology of the present disclosure is not limited thereto. The third image may not be the CC image PRc as long as it is captured in a different imaging direction from the CC image PRc of the right breast which is the second image displayed on the second display screen 31B.

Figure 17:
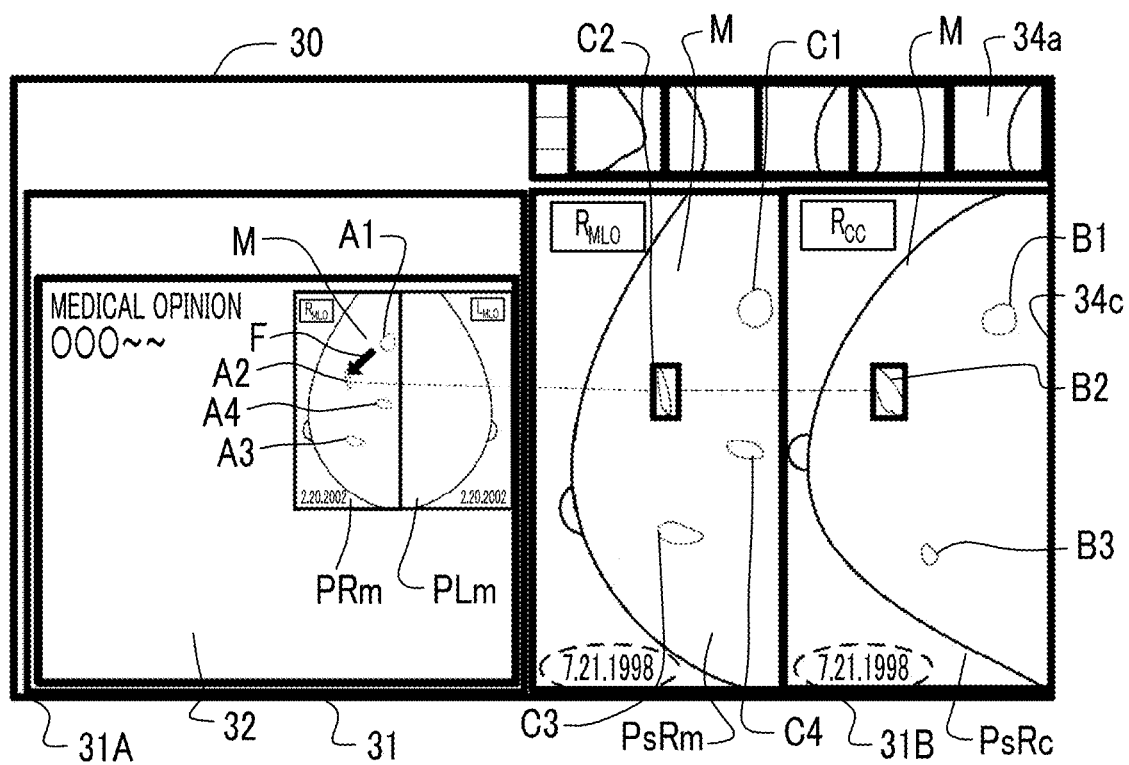
FIG. 17 is a diagram illustrating Modification Example 7 of the display of the display screen on the display unit according to the first embodiment.

FIG. 17 is a diagram illustrating Modification Example 7 of the display of the display screen 31 on the display unit 30 according to the first embodiment. In Modification Example 6, the MLO image PRm and the CC image PRc captured on the same examination date as the MLO image PRm and the MLO image PLm displayed on the first display screen 31A are displayed on the second display screen 31B. In contrast, in Modification Example 7, an MLO image PsRm and a CC image PsRc captured on a different examination date from the MLO image PRm and the MLO image PLm displayed on the first display screen 31A are displayed on the second display screen 31B.

In Modification Example 7, the MLO image PsRm and the CC image PsRc displayed on the second display screen 31B are images (hereinafter, referred to as past images) captured before the MLO image PRm and the MLO image PLm included in the image interpretation report 32. In FIG.

17, the date is before the date illustrated in FIG. 16 as represented by a dashed ellipse. For example, it is assumed that the image interpretation report 32 is a report made on the basis of the images (hereinafter, referred to as the current images) acquired by the current examination and is specifically a report made on the basis of the MLO image PRm and the CC image PRc of the right breast acquired by the current imaging.

In a case in which the user designates the desired first region of interest A, for example, the first region of interest A2 in Modification Example 7 in the MLO image PRm (an example of the first image) which is included in the image interpretation report 32 and is the current image, the second regions of interest B2 and C2 corresponding to the first region of interest A2 are displayed such that they are highlighted to be distinguishable from the other second regions of interest B1, C1, B3, and C3 in the MLO image PsRm (an example of the third image) and the CC image PsRc (an example of the second image) which are the past images displayed on the second display screen 31B. Therefore, the user can designate the desired first region of interest A2 on the current image in the image interpretation report 32 to understand the second regions of interest B2 and C2 on the past image corresponding to the designated first region of interest A2 at a glance and to easily understand the correspondence relationship between the regions of interest in the past image and the current image.

In Modification Example 7, the MLO image PRm and the MLO image PLm included in the image interpretation report 32 are the current images and the MLO image PsRm and the CC image PsRc displayed on the second display screen 31B are the past images. However, the technology of the present disclosure is not limited thereto. The MLO image PRm and the MLO image PLm included in the image interpretation report 32 may be the past images and the MLO image PsRm and the CC image PsRc displayed on the second display screen 31B may be the current images.

Figure 18:
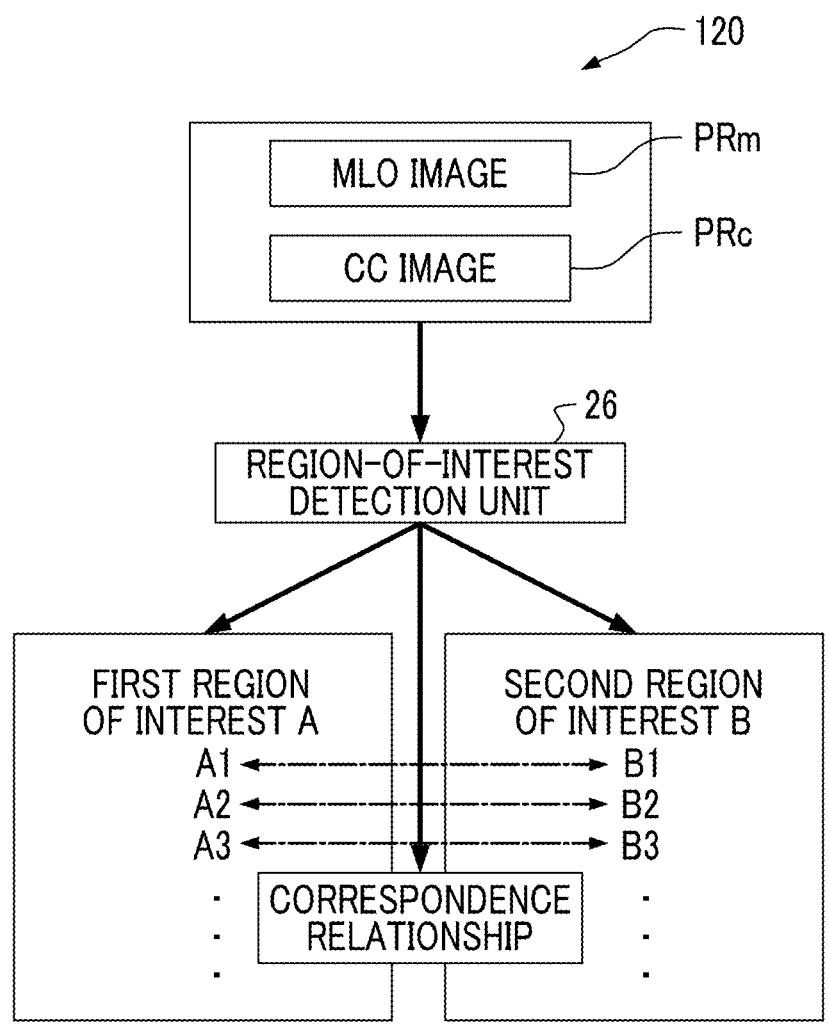
FIG. 18 is a functional block diagram illustrating a display control device according to a second embodiment.

Next, a second embodiment of the present disclosure will be described. FIG. 18 is a functional block diagram illustrating the configuration of a display control device 120 according to the second embodiment. The display control device 120 according to the second embodiment illustrated in FIG. 18 differs from the display control device 1 according to the first embodiment illustrated in FIG. 3 in that the CPU 11 further has the function of a region-of-interest detection unit 26.

The display control device 120 according to the second embodiment comprises a region-of-interest detection unit 26 as illustrated in FIG. 18. The region-of-interest detection unit 26 analyzes the MLO image PRm as the first image and the CC image PRc as the second image acquired by the image acquisition unit 21 to detect the first region of interest A in the MLO image PRm and the second region of interest B in the CC image PRc which corresponds to the first region of interest A. That is, the region-of-interest detection unit 26 detects the regions of interest at the same position in the object among the first regions of interest A in the MLO image PRm and the second regions of interest B in the CC image PRc using image analysis. Further, the region-of-interest detection unit 26 gives ID numbers to the first region of interest A and the second region of interest B corresponding to the same position so as to be associated with each other. The Information of the associated ID numbers (ID number information) is stored in accessory information.

In the second embodiment, the display control unit 25 displays all of the first regions of interest A1 to A3 and the second regions of interest B1 to B3 corresponding to each other in the MLO image PRm and the CC image PRc detected by the region-of-interest detection unit 26 on the display screen 31 of the display unit 30, as illustrated in FIG. 5 in the first embodiment.

Then, as in the configuration illustrated in FIG. 5, in a case in which the user designates the first region of interest A2, the display control unit 25 displays only the second region of interest B2 corresponding to the first region of interest A2 specified by the first region-of-interest specification unit 23 such that it is highlighted to be distinguishable from the other second regions of interest B1 and B3 in the CC image PRc.

As described above, according to the second embodiment, the region-of-interest detection unit 26 detects the first region of interest A and the second region of interest B using image analysis and associates the detected first region of interest A and the detected second region of interest B. Therefore, it is possible to simply perform the designation of the region of interest and the input of the correspondence relationship, as compared to a case in which the designation and the input are manually performed.

Figure 19:
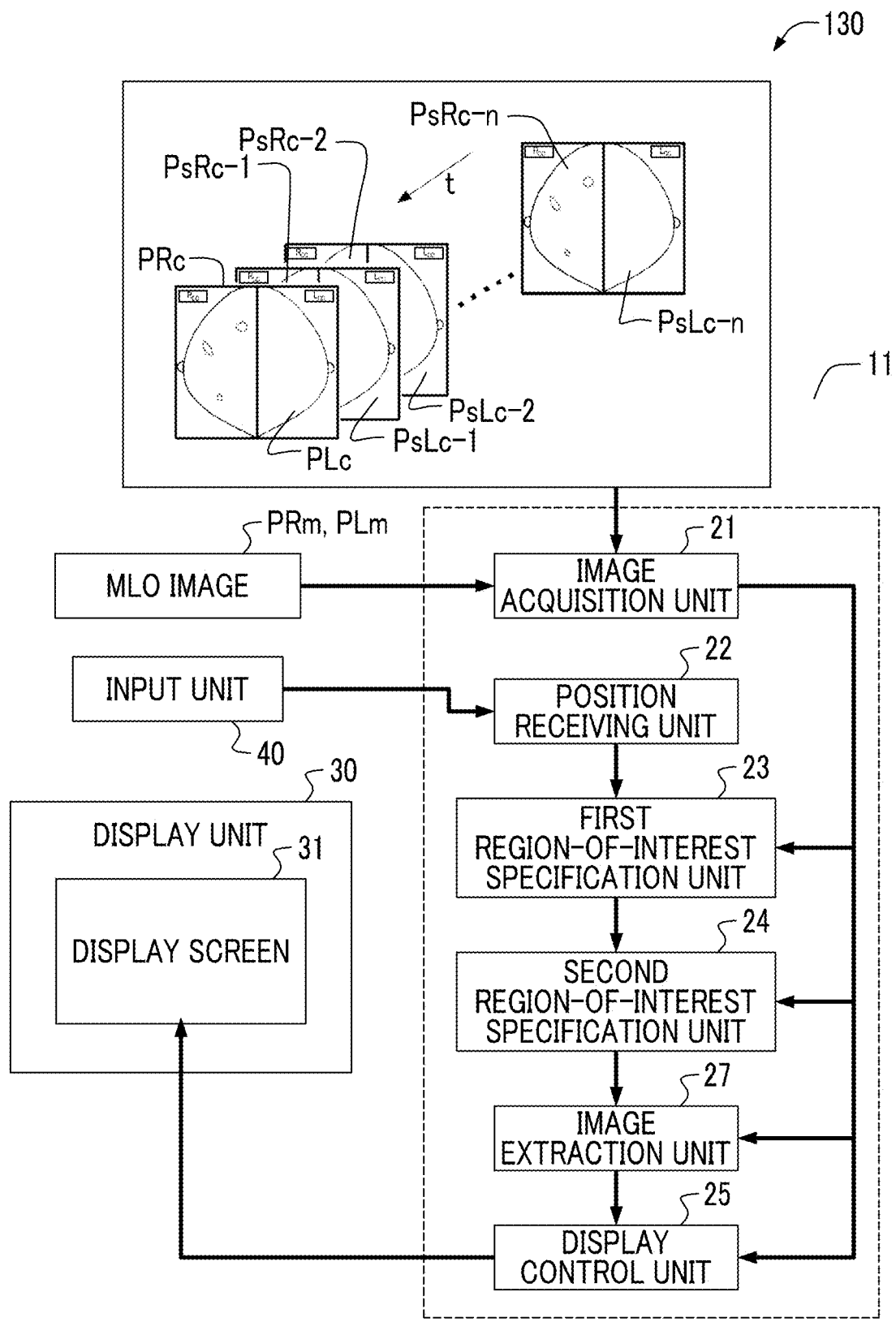
FIG. 19 is a functional block diagram illustrating a display control device according to a third embodiment.

Next, a third embodiment of the present disclosure will be described. FIG. 19 is a functional block diagram illustrating the configuration of a display control device 130 according to the third embodiment. The display control device 130 according the third embodiment illustrated in FIG. 19 differs from the display control device 1 according to the first embodiment illustrated in FIG. 4 in that the CPU 11 further has the function of an image extraction unit 27. In FIG. 19, the description of the same configuration as that in FIG. 4 will be omitted and only different portions will be described.

In the display control device 130 according to the third embodiment, as illustrated in FIG. 19, the image acquisition unit 21 acquires the MLO images PRm and PLm acquired by capturing the images of the left and right breasts and an CC image group (an example of a second image group) including a plurality of CC images PRc and PLc. The MLO images PRm and PLm are the current images acquired by the current examination. The CC image group includes the CC images captured in the same image direction at different imaging times. Specifically, the CC image group includes the CC images PRc and PLc which are the current images acquired by the current examination and CC images PsRc-1 to PsRc-n and PsLc-1 to PsLc-n which are the past images acquired by n past examinations.

Figure 20:
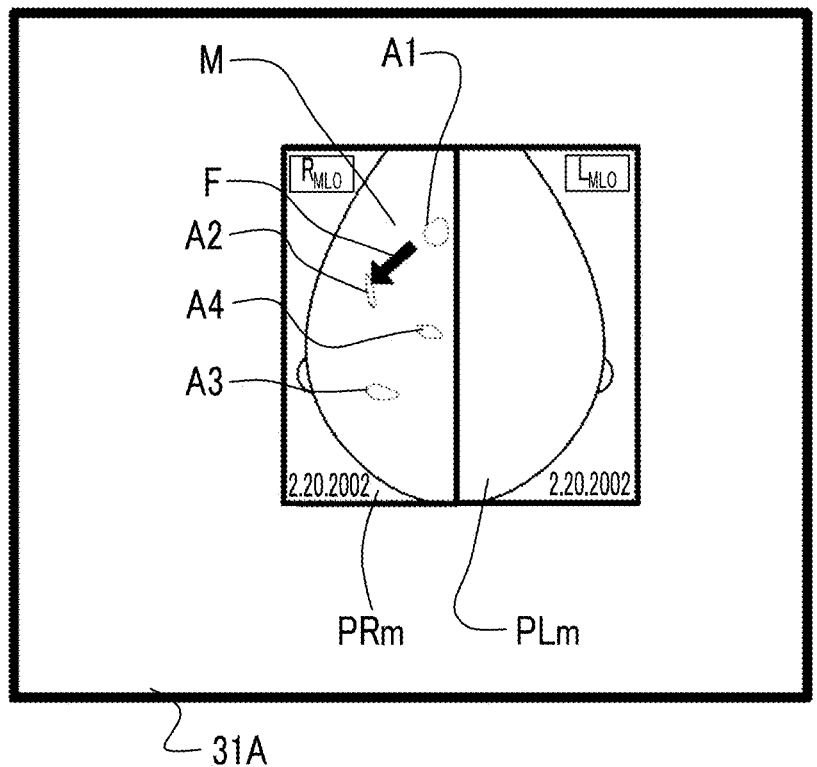
FIG. 20 is a diagram illustrating an example of the display of a first display screen on the display unit according to the third embodiment.

FIG. 20 is a diagram illustrating an example of the display of the first display screen 31A on the display unit 30 according to the third embodiment. The display control unit 25 displays the MLO images PRm and PLm on the first display screen 31A as illustrated in FIG. 20. In a case in which the user designates the first region of interest A2 and the position receiving unit 22 receives the designation of the position, for example, as illustrated in FIG. 20, the first region-of-interest specification unit 23 specifies the first region of interest A2 in the MLO image PRm on the basis of the designation of the position received by the position receiving unit 22.

The second region-of-interest specification unit 24 specifies the second region of interest B2 corresponding to the first region of interest A2 in the CC image PRc which is the current image and the CC images PsRc-1 to PsRc-n which are the past images on the basis of the first region of interest A2 specified by the first region-of-interest specification unit 23.

The image extraction unit 27 extracts the second region of interest B2 specified by the second region-of-interest specification unit 24 corresponding to the first region of interest A2 specified by the second region-of-interest specification unit 24 from the CC image PRc which is the current image and the CC images PsRc-1 to PsRc-n which are the past images. In this embodiment, it is assumed that the second region of interest B2 is specified in the CC image PRc which is the current image and the CC images PsRc-1 and PsRc-2 which are the past images.

Figure 21:
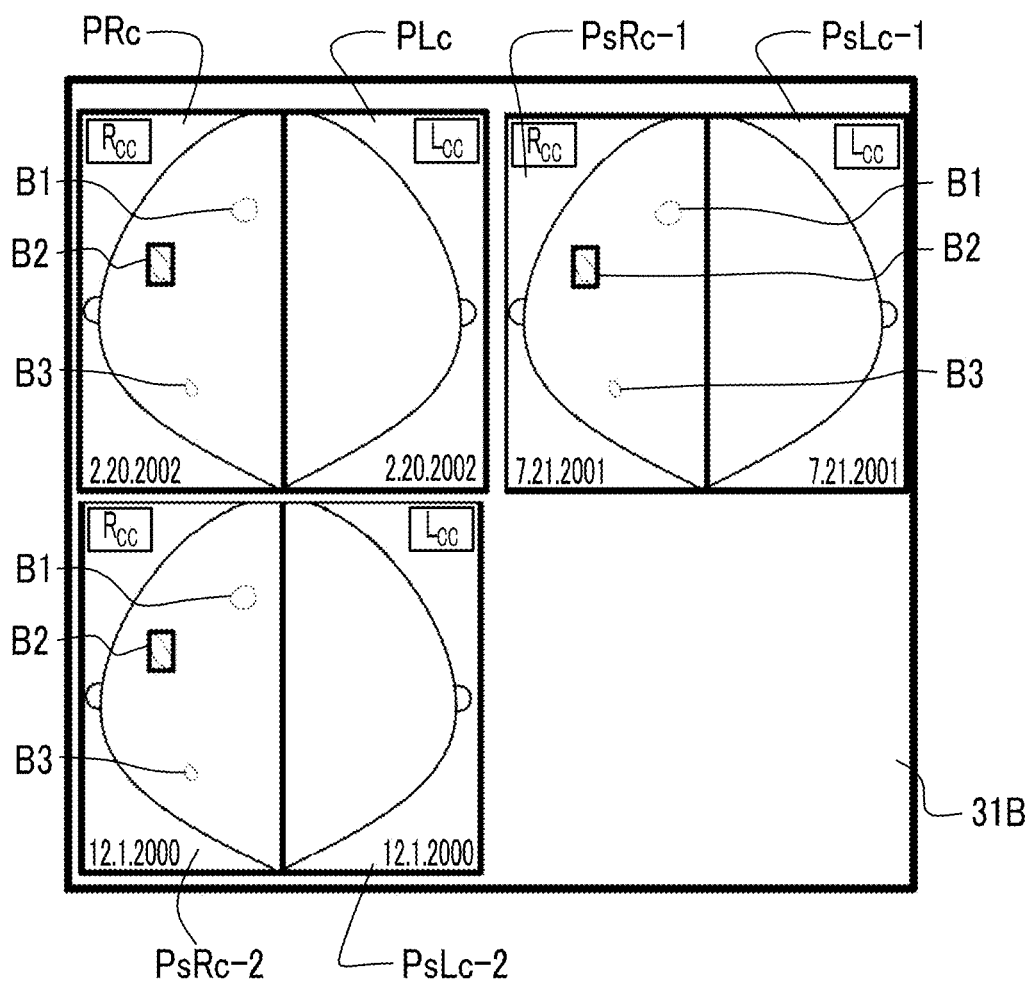
FIG. 21 is a diagram illustrating an example of the display of a second display screen on the display unit according to the third embodiment.

The display control unit 25 displays the CC image extracted by the image extraction unit 27 on the second display screen 31B. FIG. 21 is a diagram illustrating an example of the display of the display screen 31B on the display unit 30 according to the third embodiment. As illustrated in FIG. 21, the display control unit 25 displays, on the second display screen 31B, the CC image PRc, the CC image PsRc-1, and the CC image PsRc-2 extracted by the image extraction unit 27 and the CC image PLc, the CC image PsLc-1, and the CC image PsLc-2 which are the CC images of the left breast corresponding to the CC image PRc, the CC image PsRc-1, and the CC image PsRc-2, respectively.

Further, the display control unit 25 displays the second region of interest B2 corresponding to the first region of interest A2 specified by the first region-of-interest specification unit 23 such that it is highlighted to be distinguishable from the other second regions of interest B1 and B3 in each of the CC images PRc, PsRc-1, and PsRc-2. In this embodiment, only the second region of interest B2 is surrounded with a frame to be highlighted.

Figure 22:
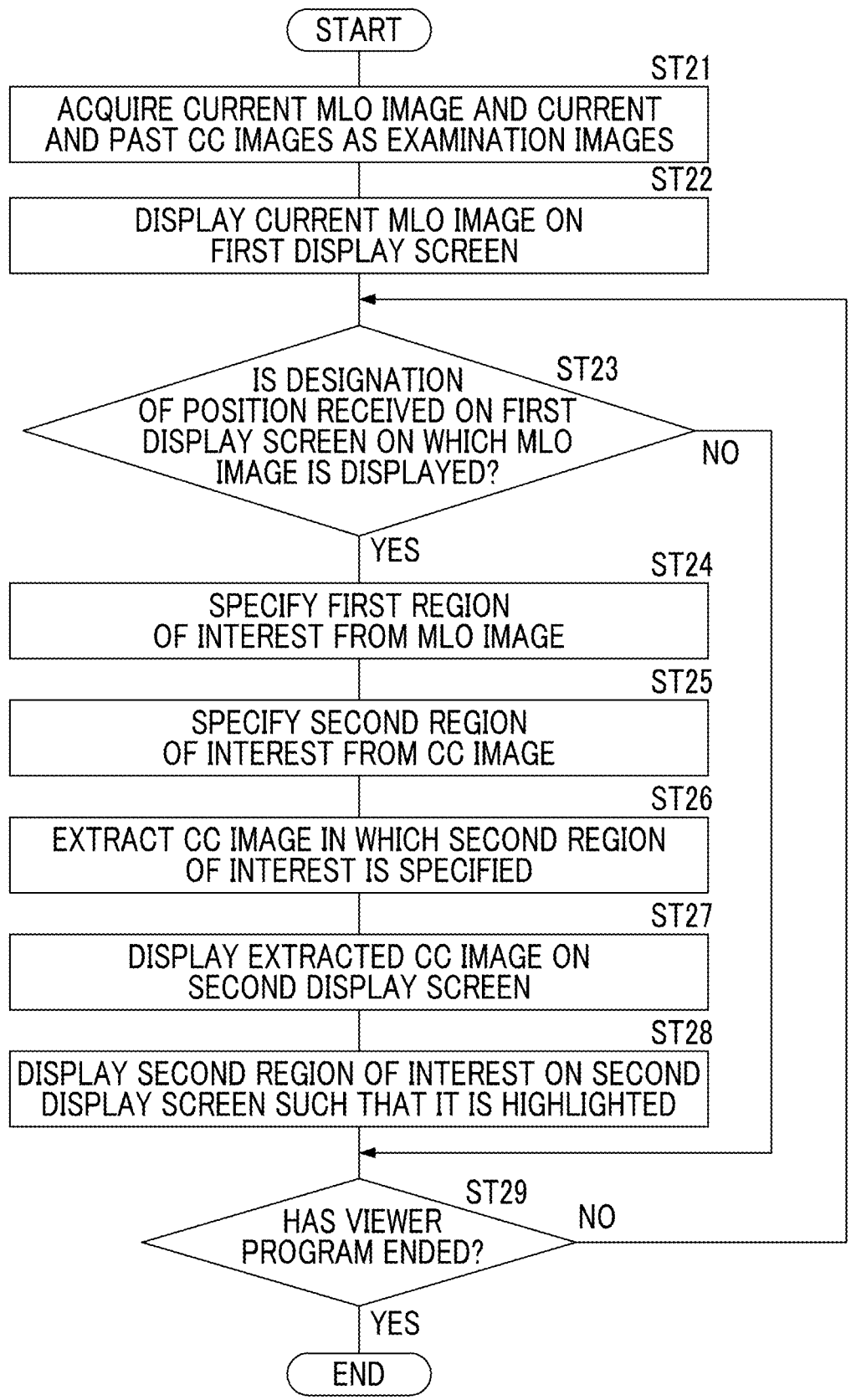
FIG. 22 is a flowchart illustrating a process performed in the third embodiment.

Next, a process performed in the third embodiment will be described. FIG. 22 is a flowchart illustrating the process performed in the third embodiment of the present disclosure.

In a case in which a patient is selected from the patient list after the viewer program is started, first, the image acquisition unit 21 acquires the MLO images PRm and PLm (an example of the first images) which are the current images acquired by the current examination. In addition, the image acquisition unit 21 acquires, as the examination images, a CC image group (an example of the second image group) including the CC images PRc and PLc as the current images and the CC images PsRc-1 to PsRc-n and PsLc-1 to PsLc-n as the past images acquired by the past examinations which correspond to the MLO images PRm and PLm (Step ST21).

Then, the display control unit 25 displays the MLO images PRm and PLm which are the current images acquired by the image acquisition unit 21 on the first display screen 31A of the display unit 30 as illustrated in FIG. 20 (Step ST22).

After Step ST22, the position receiving unit 22 monitors whether or not the designation of a position has been received in the MLO images PRm and PLm displayed on the first display screen 31A (Step ST23). In this embodiment, as illustrated in FIG. 20, there are four first regions of interest A1 to A4 in the MLO image PRm.

In a case in which the monitoring result in Step ST23 is "No" (Step ST23; NO), the CPU 11 advances the process to Step ST29.

In a case in which the monitoring result in Step ST23 is "Yes" (Step ST23; YES), the first region-of-interest specification unit 23 specifies the first region of interest A2 in the MLO image PRm on the basis of the designation of the position received by the position receiving unit 22 (Step ST24). Then, the second region-of-interest specification unit 24 specifies the second region of interest B from the CC image PRc acquired by the image acquisition unit 21 on the basis of the first region of interest A2 specified by the first region-of-interest specification unit 23. Specifically, the second region-of-interest specification unit 24 specifies the second region of interest B2 corresponding to the first region of interest A2 in the CC image PRc which is the current image and the CC images PsRc-1 to PsRc-n which are the past images (Step ST25). In this embodiment, the second region of interest B2 is specified in three CC images, that is, the CC image PRc which is the current image and the CC images PsRc-1 and PsRc-2 which are the past images.

Then, the image extraction unit 27 extracts the CC image in which the second region of interest B2 has been specified by the second region-of-interest specification unit 24 (Step ST26). In this embodiment, the CC image PRc which is the current image and the CC images PsRc-1 and PsRc-2 which are the past images are extracted.

Then, the display control unit 25 displays, on the second display screen 31B, the CC image PRc, the CC image PsRc-1, and the CC image PsRc-2 extracted by the image extraction unit 27 and the CC image PLc, the CC image PsLc-1, and the CC image PsLc-2 which are the CC images of the left breast corresponding to the CC image PRc, the CC image PsRc-1, and the CC image PsRc-2, respectively (Step ST27). In this case, the display control unit 25 displays, on the second display screen 31B, the second region of interest B2 corresponding to the first region of interest A2 specified by the first region-of-interest specification unit 23 such that it is highlighted to be distinguishable from the other second regions of interest B1 and B3 in each of the CC images PRc, PsRc-1, and PsRc-2 (Step ST28).

Then, the CPU 11 determines whether or not the viewer program has ended (Step ST29). In a case in which the determination result in Step ST29 is "Yes" (Step ST29; YES), the CPU 11 ends the process. On the other hand, in a case in which the determination result in Step ST29 is "No" (Step ST29; NO), the CPU 11 returns the process to Step ST23 and performs the process in Step ST23 and the subsequent steps. As described above, the CPU 11 repeats the series of processes until the viewer program ends.

According to the third embodiment, in a case in which image diagnosis is performed on a plurality of CC images (an example of the second images) captured at different imaging times and the designation of a position is received in the MLO image PRm (an example of the first image), a CC image including the second region of interest B corresponding to the first region of interest A in the MLO image PRm specified by the designation of the position is extracted and displayed. Further, only the specified second region of interest B corresponding to the first region of interest A in the MLO image PRm is displayed such that it is highlighted to be distinguishable from the other regions of interest B in the displayed CC image. Therefore, in a case in which image diagnosis is performed on the basis of the MLO images PRm captured in different imaging directions and the CC images captured at different imaging times and a plurality of regions of interest are present in each of the MLO images PRm and the CC images, it is possible to understand the correspondence relationship between the first region of interest A and the second region of interest B at a glance in the images captured in different imaging directions.

In the third embodiment, the display control unit 25 displays the CC images of the left and right breasts on the second display screen 31B. However, the technology of the present disclosure is not limited thereto. The display control unit 25 may display, on the second display screen 31B, only the CC image of one breast including the first region of interest A specified on the first display screen 31A.

Figure 23:
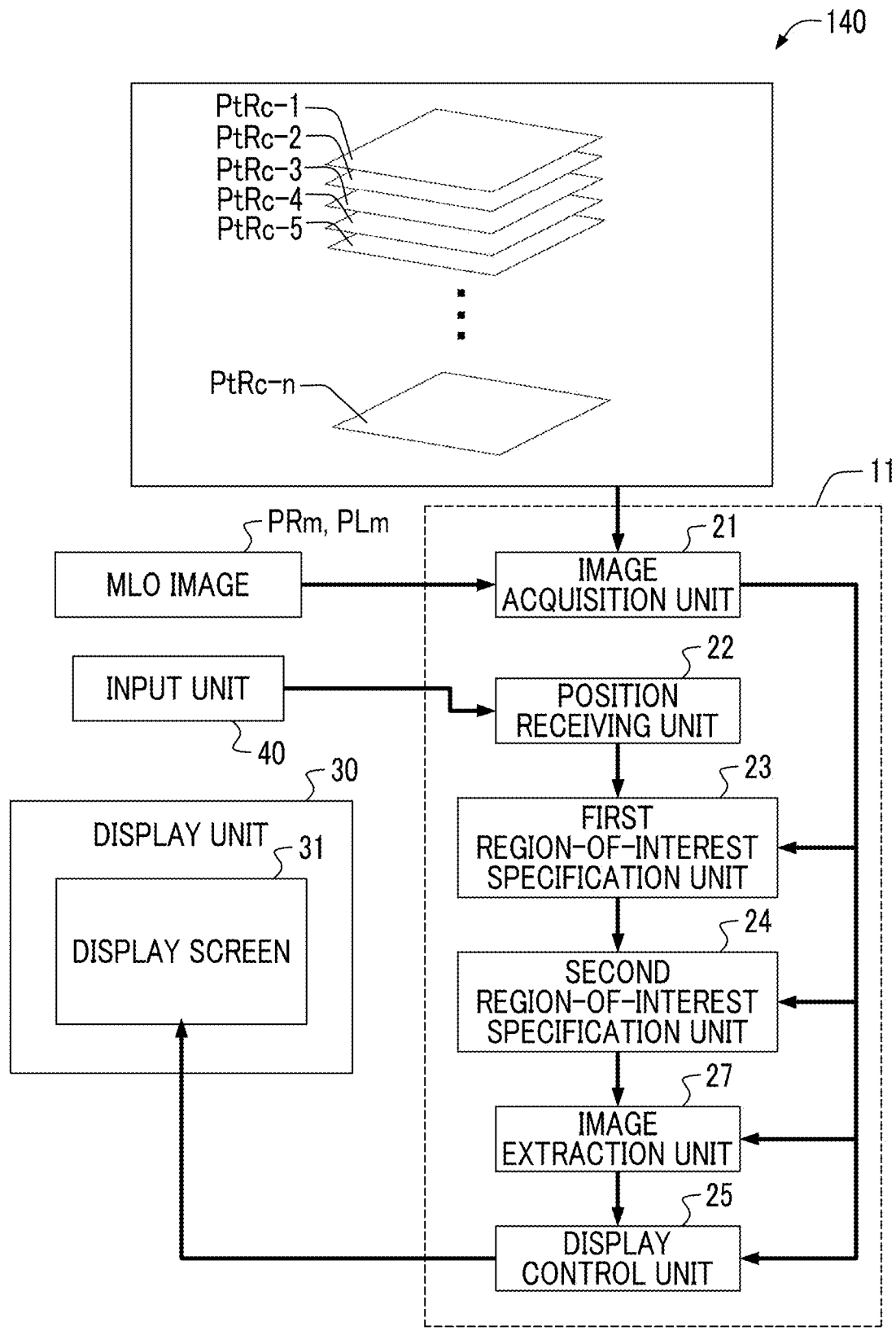
FIG. 23 is a functional block diagram illustrating a display control device according to a fourth embodiment.

Next, a fourth embodiment of the present disclosure will be described. FIG. 23 is a functional block diagram illustrating a display control device 140 according to the fourth embodiment. In the third embodiment, the CC image group acquired by the image acquisition unit 21 includes the CC images captured in the same imaging direction at different imaging times. In contrast, in the display control device 140 according to the fourth embodiment, as illustrated in FIG. 23, a CC image group acquired by the image acquisition unit 21 includes a plurality of tomographic images (hereinafter, referred to as CC tomographic images) indicating different tomographic planes of the breast.

The tomographic images are acquired by tomosynthesis imaging. As described above, the tomosynthesis imaging is an imaging method that irradiates the breast with radiation at different irradiation angles to perform imaging and performs a process of reconstructing a plurality of projection images acquired by the imaging to generate tomographic images. The CC tomographic images are images generated by the process of reconstructing the projection images acquired by locating a radiation source with respect to the breast in the vertical direction and capturing the images of the breast. In this embodiment, the image acquisition unit 21 acquires MLO images PRm and PLm and n CC tomographic images PtRc-1 to PtRc-n (an example of the second image group) acquired by capturing the images of the left and right breasts.

In this embodiment, the second region-of-interest specification unit 24 specifies the second region of interest B2 corresponding to the first region of interest A2 in the n CC tomographic images PtRc-1 to PtRc-n on the basis of the first region of interest A2 specified by the first region-of-interest specification unit 23.

The image extraction unit 27 extracts an image including the second region of interest B2 which has been specified by the second region-of-interest specification unit 24 and corresponds to the first region of interest A2 which has been specified by the second region-of-interest specification unit 24 from the n CC tomographic images PtRc-1 to PtRc-n. In this embodiment, it is assumed that the second region of interest B2 is specified in three CC tomographic images PtRc-1, PtRc-2, and PtRc-4.

The display control unit 25 displays the CC tomographic images PtRc-1, PtRc-2, and PtRc-4 extracted by the image extraction unit 27 on the second display screen 31B. As in the case illustrated in FIG. 21, the display control unit 25 displays, on the second display screen 31B, the CC tomographic images PtRc-1, PtRc-2, and PtRc-4 extracted by the image extraction unit 27 and CC tomographic images PtLc-1, PtLc-2, and PtLc-4 of the left breast which correspond to the CC tomographic images PtRc-1, PtRc-2, and PtRc-4, respectively.

Figure 24:
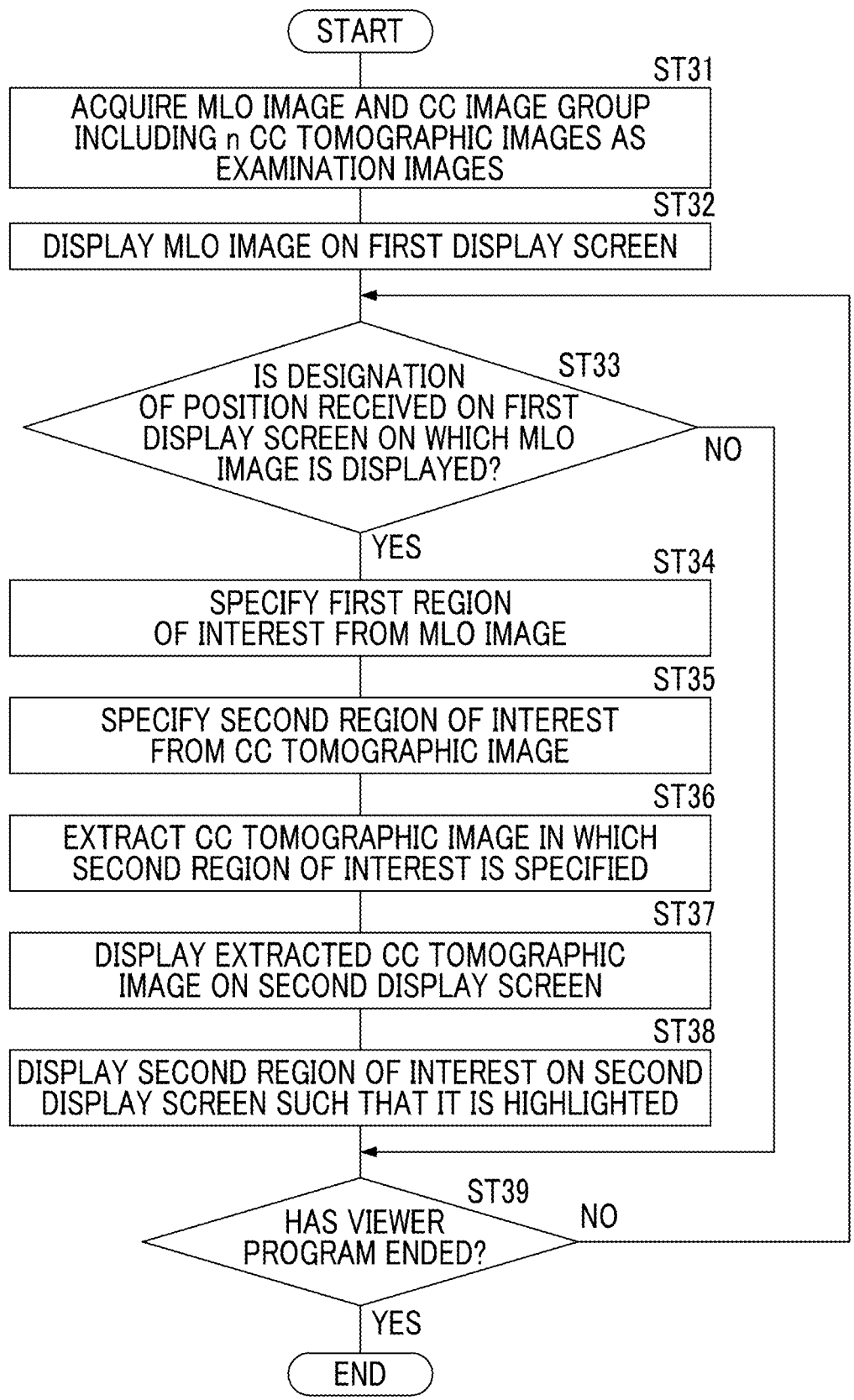
FIG. 24 is a flowchart illustrating a process performed in the fourth embodiment.

Next, a process performed in the fourth embodiment will be described. FIG. 24 is a flowchart illustrating the process performed in the fourth embodiment of the present disclosure.

In a case in which a patient is selected from a patient list after the viewer program is started, first, the image acquisition unit 21 acquires the MLO images PRm and PLm (an example of the first images) acquired by capturing the images of the left and right breasts. In addition, the image acquisition unit 21 acquires, as the examination images, a CC image group (an example of the second image group) including n CC tomographic images PtRc-1 to PtRc-n as the CC images corresponding to the MLO images PRm and PLm (Step ST31).

Then, the display control unit 25 displays the MLO images PRm and PLm acquired by the image acquisition unit 21 on the first display screen 31A of the display unit 30 (see FIG. 20) (Step ST32).

After Step ST32, the position receiving unit 22 monitors whether or not the designation of a position has been received in the MLO images PRm and PLm displayed on the first display screen 31A (Step ST33). In this embodiment, there are four first regions of interest A1 to A4 in the MLO image PRm (see FIG. 20).

In a case in which the monitoring result in Step ST33 is "No" (Step ST33; NO), the CPU 11 advances the process to Step ST39.

In a case in which the monitoring result in Step ST33 is "Yes" (Step ST33; YES), the first region-of-interest specification unit 23 specifies the first region of interest A2 in the MLO image PRm on the basis of the designation of the position received by the position receiving unit 22 (Step ST34). Then, the second region-of-interest specification unit 24 specifies the second region of interest B from the CC tomographic image PtRc acquired by the image acquisition unit 21 on the basis of the first region of interest A2 specified by the first region-of-interest specification unit 23. Specifically, the second region-of-interest specification unit 24 specifies the second region of interest B2 corresponding to the first region of interest A2 in the n CC tomographic images PtRc-1 to PtRc-n (Step ST35). In this embodiment, the second region of interest B2 is specified in three CC tomographic images PtRc-1, PtRc-2, and PtRc-4.

Then, the image extraction unit 27 extracts the CC tomographic image in which the second region of interest B2 is specified by the second region-of-interest specification unit 24 (Step ST36). In this embodiment, the three CC tomographic images PtRc-1, PtRc-2, and PtRc-4 are extracted.

Then, the display control unit 25 displays, on the second display screen 31B, the three CC tomographic images PtRc-1, PtRc-2, and PtRc-4 extracted by the image extraction unit 27 and the CC tomographic images PtLc-1, PtLc-2, and PtLc-4 which are the CC tomographic images of the left breast corresponding to the three CC tomographic images PtRc-1, PtRc-2, and PtRc-4, respectively (Step ST37). In this case, the display control unit 25 displays the second region of interest B2 corresponding to the first region of interest A2 specified by the first region-of-interest specification unit 23 such that it is highlighted to be distinguishable from the other second regions of interest B1 and B3 in each of the CC tomographic images PtRc-1, PtRc-2, and PtRc-4 (Step ST38).

Then, the CPU 11 determines whether or not the viewer program has ended (Step ST39). In a case in which the determination result in Step ST39 is "Yes" (Step ST39; YES), the CPU 11 ends the process. On the other hand, in a case in which the determination result in Step ST39 is "No" (Step ST39; NO), the CPU 11 returns the process to Step ST33 and performs the process in Step ST33 and the subsequent steps. As described above, the CPU 11 repeats the series of processes until the viewer program ends.

According to the fourth embodiment, in a case in which image diagnosis is performed on a plurality of CC tomographic images (an example of the tomographic images) indicating different tomographic planes of the breast and the designation of a position is received in the MLO image PRm (an example of the first image), a CC tomographic image including the second region of interest B corresponding to the first region of interest A in the MLO image PRm specified by the designation of the position is extracted and displayed. Further, only the specified second region of interest B corresponding to the first region of interest A in the MLO image PRm is displayed such that it is highlighted to be distinguishable from the other regions of interest in the displayed CC tomographic image. Therefore, in a case in which image diagnosis is performed on the basis of the MLO images PRm captured in different imaging directions and the CC tomographic images captured at different imaging times and a plurality of regions of interest are present in each of the MLO images PRm and the CC tomographic images indicating different tomographic planes of the breast, it is possible to understand the correspondence relationship between the first region of interest A and the second region of interest B at a glance in the images captured in different imaging directions.

Figure 25:
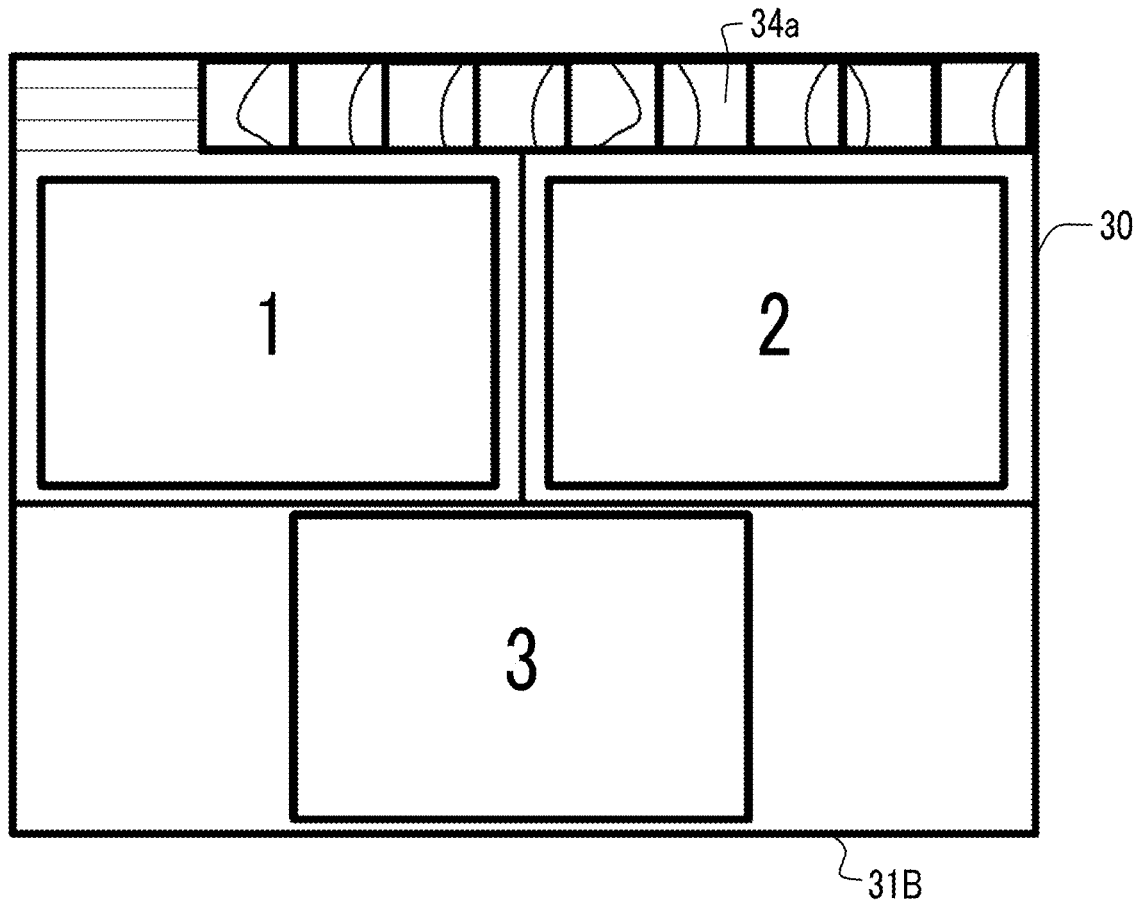
FIG. 25 is a diagram illustrating an example of the display of a second display screen on the display unit.

In the third and fourth embodiments, the second display screen 31B is divided into a plurality of regions on the basis of the number of CC images or CC tomographic images extracted by the image extraction unit 27 and the extracted CC images or CC tomographic images are displayed in each of the divided regions. FIG. 25 is a diagram illustrating the second display screen 31B of the display unit 30 according to an embodiment of the present disclosure.

For example, in a case in which the number of CC images or CC tomographic images extracted by the image extraction unit 27 is three, the display control unit 25 divides the second display screen 31B into a total of three regions, that is, two upper regions and one lower region and displays the extracted CC images or CC tomographic images in each of the divided regions as illustrated in FIG. 25. The user can set any method for dividing the second display screen 31B.

Figure 26:
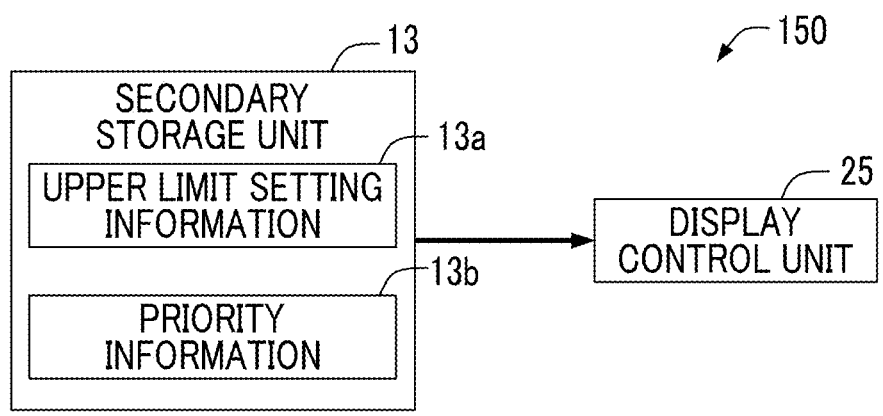
FIG. 26 is a functional block diagram illustrating a display control device according to a fifth embodiment.

Next, a fifth embodiment of the present disclosure will be described. FIG. 26 is a functional block diagram illustrating the configuration of a display control device 150 according to the fifth embodiment. The display control device 150 illustrated in FIG. 26 differs from the display control device 130 according to the third embodiment illustrated in FIG. 19 in that upper limit setting information 13a is further stored in the secondary storage unit 13. The upper limit setting information 13a indicates the upper limit of the number of CC images that can be displayed on the second display screen 31B. The user can set the upper limit of the number of CC images in the upper limit setting information 13a in advance using the input unit 40 and can change the setting of the upper limit.

Figure 27:
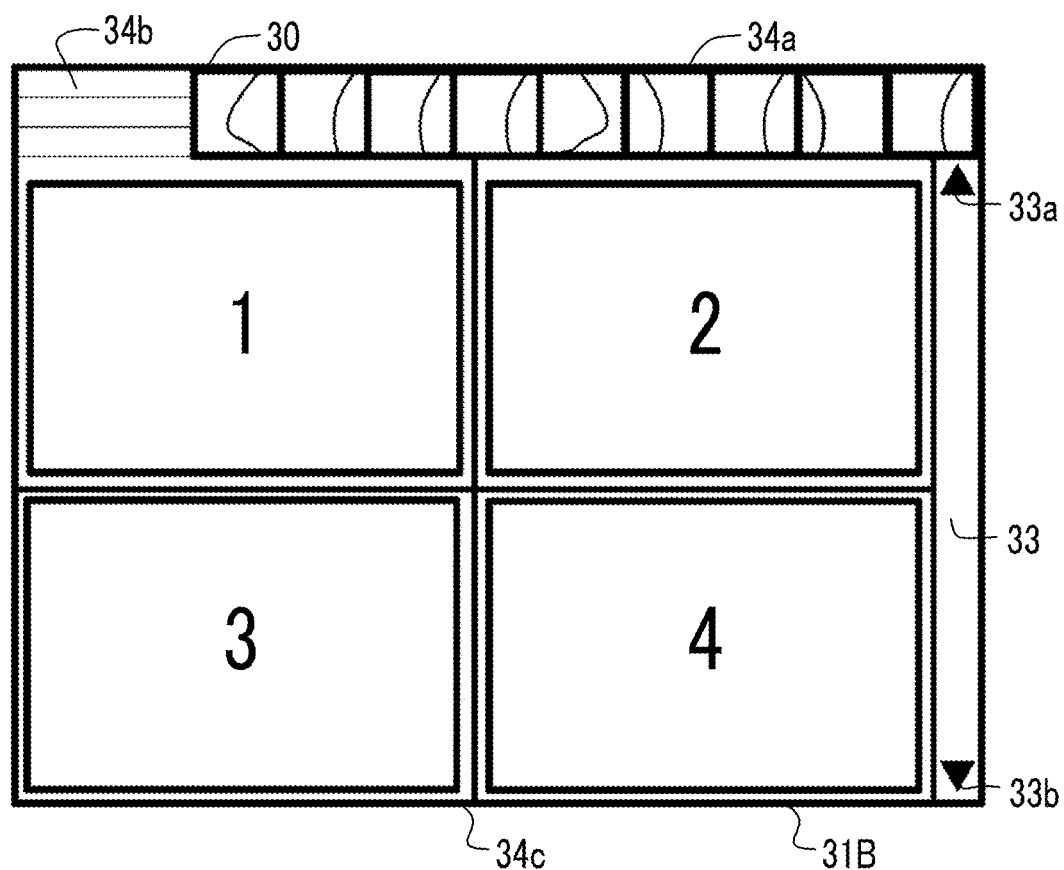
FIG. 27 is a diagram illustrating an example of the display of a second display screen on the display unit in the fifth embodiment (part 1).
Figure 28:
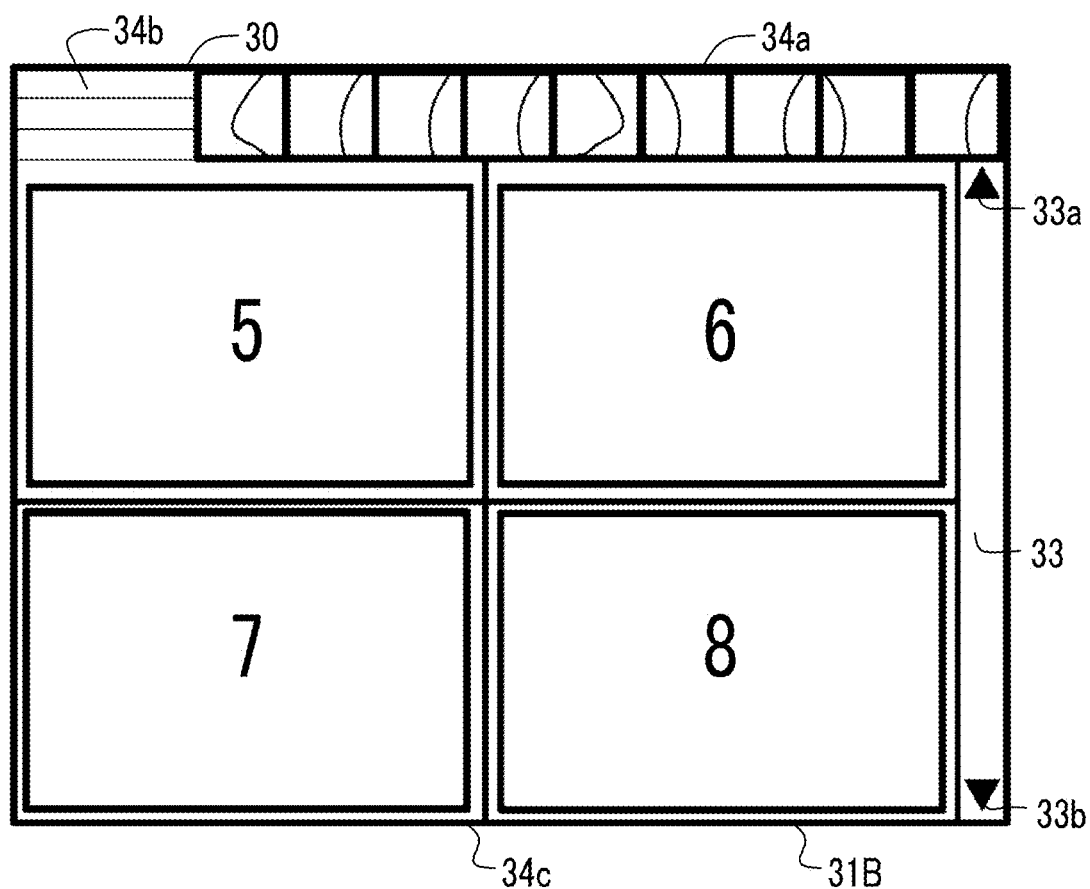
FIG. 28 is a diagram illustrating an example of the display of the second display screen on the display unit in the fifth embodiment (part 2).

In the fifth embodiment, in a case in which the upper limit of the number of CC images that can be displayed on the second display screen 31B is set and the number of CC images extracted by the image extraction unit 27 is greater than the upper limit, the display control unit 25 divides the CC images into a plurality of pages and displays the CC images so as to be switched. FIGS. 27 and 28 are diagrams illustrating an example of the display of the second display screen 31B on the display unit 30 in the fifth embodiment.

For example, it is assumed that the number of CC images that can be displayed on the second display screen 31B is set to four. In this case, the display control unit 25 divides an image display region 34c for displaying the CC images into a total of four regions, that is, two upper regions and two lower regions. Then, it is assumed that the image extraction unit 27 extracts, for example, five or more CC images. In this case, as illustrated in FIGS. 27 and 28, the display control unit 25 displays a scroll bar 33 adjacent to the image display region 34c for displaying the CC images on the second display screen 31B. An up arrow 33a for scrolling up and a down arrow 33b for scrolling down are displayed on the upper and lower sides of the scroll bar 33, respectively.

First, the display control unit 25 displays four CC images in four regions of the image display region 34c as illustrated in FIG. 27. Then, in a case in which the down arrow 33b is operated, the display control unit 25 displays CC images except the CC images displayed before the down arrow 33b is operated in the four divided regions as illustrated in FIG. 28. Then, whenever the down arrow 33b is operated, the CC images are sequentially displayed in the same manner. In addition, in a case in which the up arrow 33a is operated, the display control unit 25 returns to the previous display of the current display. That is, in a case in which the up arrow 33a is operated in the display state illustrated in FIG. 28, the display control unit 25 displays the display aspect illustrated in FIG. 27.

In the fifth embodiment, the number of divided regions in the image display region 34c can be preset by the user. In addition, the layout of the divided regions can be preset by the user. Further, in the fifth embodiment, the display control unit 25 can display the CC images extracted by the image extraction unit 27 in descending order of the priority. As illustrated in FIG. 26, priority information 13b is further stored in the secondary storage unit 13. The priority information 13b indicates the order in which the CC images are displayed on the second display screen 31B. The setting of priorities in the priority information 13b is set in advance and can be changed by the user.

Specifically, for example, in a case in which the image extraction unit 27 extracts a plurality of CC images captured at different imaging times, the priorities are set as the priority information 13b such that the highest priority is given to the CC image captured at the latest imaging date and time. Further, in a case in which the image extraction unit 27 extracts a plurality of CC tomographic images, the priorities may be set such that the highest priority is given to the CC tomographic image having the largest second region of interest among the second regions of interests specified in the extracted CC tomographic images. As such, the priorities are set and the examination images, such as the CC images and the CC tomographic images (an example of the second images), are displayed on the second display screen 31B in descending order of priority. Therefore, the user can start image interpretation from the examination image with a high priority.

Further, in the above-described embodiments, the breast image is used as the examination image. However, the technology of the present disclosure is not limited thereto. The examination image may be, for example, a head image, a chest image, an abdominal image, an image of, for example, a hand or a foot, or an image of any part.

Further, in the above-described embodiments, the first display screen 31A and the second display screen 31B are provided on the same display unit 30. However, the technology of the present disclosure is not limited thereto. In a case in which there are two display units 30, the first display screen 31A and the second display screen 31B may be displayed on each display unit 30.

Furthermore, in the above-described embodiments, the first image on which the designation of a position is received is the MLO image and the second image in which the second region of interest B corresponding to the first region of interest A of the first image is displayed so as to be highlighted is the CC image. However, the technology of the present disclosure is not limited thereto. The first image on which the designation of a position is received may be the CC image and the second image in which the second region of interest B corresponding to the first region of interest A is displayed so as to be highlighted may be the MLO image.

In the above-described embodiments, for example, the following various processors can be used as the hardware structure of processing units performing various processes, such as the image acquisition unit 21, the position receiving unit 22, the first region-of-interest specification unit 23, the second region-of-interest specification unit 24, the display control unit 25, the region-of-interest detection unit 26, and the image extraction unit 27. The various processors include, for example, a CPU which is a general-purpose processor executing software (program) to function as various processing units, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs or a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As such, various processing units are configured by using one or more of the various processors as a hardware structure.

Furthermore, specifically, an electric circuit (circuitry) obtained by combining circuit elements, such as semiconductor elements, can be used as the hardware structure of the various processors.

EXPLANATION OF REFERENCES

1: display control device
2: imaging apparatus
3: Image storage server
4: network
11: CPU
12: primary storage unit
13: secondary storage unit
13a: upper limit setting information
13b: priority information
14: external I/F
15: operation program
16: bus line
21: image acquisition unit
22: position receiving unit
23: first region-of-interest specification unit
24: second region-of-interest specification unit
25: display control unit
26: region-of-interest detection unit
27: image extraction unit
30: display unit
31: display screen
31A: display screen
31B: display screen
32: image interpretation report
33: scroll bar
33a: up arrow
33b: down arrow
34a: thumbnail image display region
34b: selection region
34c: image display region
40: input unit
A1, A2, A3, A4: first region of interest
B1, B2, B3: second region of interest
F: cursor
M: breast
N: nipple
PLc: CC image of left breast
PRc: CC image of right breast
PLm: MLO image of left breast
PRm: MLO image of right breast
Pa2, Pb2: enlarged image
PtLc: CC tomographic image of left breast
PtRc: CC tomographic image of right breast

What is claimed is:

1. A display control device comprising:
a display; and
a processor configured to
acquire a first image of an object and a second image of the same object as the first image, the second image having been captured in a different imaging direction from the first image;
acquire information on multiple first regions of interest in the first image and multiple second regions of interest in the second image, each of the second regions of interest being corresponded to a different one of the first regions of interest;
display the first image including displaying of the first regions of interest and the second image including displaying of the second regions of interest on the display;
receive designation of a position which is an abnormal shadow in the first image displayed on the display;
specify a designated first region of interest among the first regions of interest included in the first image on the basis of the designation of the position;
specify a designated second region of interest corresponding to the designated first region of interest on the basis of the designated first region of interest among the second regions of interest included in the second image; and
display the designated second region of interest corresponding to the designated first region of interest so as to be highlighted on the display, wherein display the designated second region of interest corresponding to the designated first region of interest so as to be highlighted on the display comprising:
in response to displaying the multiple first regions of interest in the first image and specifying the designated first region of interest among the first regions of interest included in the first image, the processor is further configured to display only the designated second region of interest corresponding to the designated first region of interest such that the designated second region of interest is highlighted to be distinguishable from other second regions of interest.

2. The display control device according to claim 1, wherein the processor is further configured to
analyze the first image and the second image to detect the first regions of interest and the second regions of interest corresponding to the first regions of interest;
display all of the detected regions of interest on the display; and
display only the designated second region of interest corresponding to one of the designated first region of interest in a case in which the processor receives the designation of the position which is the abnormal shadow in the first image displayed on the display.

3. The display control device according to claim 2, further comprising:
wherein the processor is further configured to
receive another designation of another abnormal shadow in the first image displayed on the display, and
display only a designated second region of interest which corresponds to a same location as the another designation of the another abnormal shadow in the first image displayed on the display.

4. The display control device according to claim 1,
wherein the processor is further configured to display a plurality of display screens on one or a plurality of displays.

5. The display control device according to claim 1,
wherein the processor is further configured to display a plurality of display screens on one or a plurality of displays.

6. The display control device according to claim 2,
wherein the processor is further configured to display a plurality of display screens on one or a plurality of displays.

7. The display control device according to claim 4,
wherein the display screens include a first display screen for displaying an image interpretation report in which content of image diagnosis is recorded and a second display screen for displaying an image, and
the processor is further configured to display the first image and the second image on the second display screen.

8. The display control device according to claim 4,
wherein the display screens include a first display screen for displaying an image interpretation report in which content of image diagnosis is recorded and a second display screen for displaying an image, and
the processor is further configured to display the first image on the first display screen and display the second image on the second display screen, or display the second image on the first display screen and display the first image on the second display screen.

9. The display control device according to claim 8,
wherein the processor is further configured to
acquire a third image of the object captured in a different imaging direction from the second image; and
display the first image on the first display screen and display the second image and the third image on the second display screen.

10. The display control device according to claim 1,
wherein the first image and the second image are images captured on the same examination date.

11. The display control device according to claim 9,
wherein the first image and the third image are images captured in the same imaging direction.

12. The display control device according to claim 9,
wherein an examination date on which the first image is captured is different from an examination date on which at least one of the second image or the third image is captured.

13. The display control device according to claim 7,
wherein the processor is further configured to acquire a second image group including a plurality of second images, and
the second image group is an image group including a plurality of images captured in the same imaging direction at different imaging times or an image group including a plurality of tomographic images indicating different tomographic planes of the object.

14. The display control device according to claim 13,
wherein the processor is further configured to specify the second regions of interest corresponding to the first regions of interest from the second image group on the basis of the first regions of interest,
extract the second image including the designated second region of interest corresponding to the designated first region of interest from the second image group, and
in a case in which the processor receives the designation of the position in the first image, the processor is further configured to display the designated second region of interest corresponding to the designated first region of interest so as to be highlighted in the extracted second image.

15. The display control device according to claim 14,
wherein the processor is further configured to
extract a plurality of second images including the designated second region of interest corresponding to the designated first region of interest from the second image group;
display the extracted plurality of the second images on the second display screen; and
divide the second display screen into a plurality of regions on the basis of the number of the extracted plurality of second images and display the extracted plurality of second images in each of the divided regions.

16. The display control device according to claim 15,
wherein, in a case in which an upper limit of the number of the extracted plurality of second images capable of being displayed on the second display screen is set and the number of the extracted plurality of second images is greater than the upper limit, the processor is further configured to divide the extracted plurality of second images into a plurality of pages and display the extracted plurality of second images so as to be switched.

17. The display control device according to claim 16,
wherein, in a case in which priorities for displaying the extracted plurality of second images are set and the number of the extracted plurality of second images is greater than the upper limit, the processor is further configured to display the extracted plurality of second images on the second display screen in descending order of the priority.

18. A method for operating a display control device, the method comprising:
acquiring a first image of an object and a second image of the same object as the first image which has been captured in a different imaging direction from the first image;
acquiring information on multiple first regions of interest in the first image and multiple second regions of interest in the second image, each of the second regions of interest being corresponded to a different one of the one or more first regions of interest;
displaying the first image including displaying of the first regions of interest and the second image including the second regions of interest on a display;
receiving designation of a position which is an abnormal shadow in the first image displayed on the display;
specifying a designated first region of interest among the first regions of interest included in the first image on the basis of the designation of the position;
specifying a designated second region of interest corresponding to the designated first region of interest in the second image on the basis of the designated first region of interest among the second regions of interest included in the second image; and displaying the designated second region of interest corresponding to the designated first region of interest so as to be highlighted, wherein display the designated second region of interest corresponding to the designated first region of interest so as to be highlighted on the display comprising:
- in response to displaying the multiple first regions of interest in the first image and specifying the designated first region of interest among the first regions of interest included in the first image, displaying only the designated second region of interest corresponding to the designated first region of interest such that the designated second region of interest is highlighted to be distinguishable from other second regions of interest which are not displayed in the second image.

19. A non-transitory computer readable medium for storing a program for operating an image display device, the program causing a computer to perform operations comprising:

acquiring a first image of an object and a second image of the same object as the first image which has been captured in a different imaging direction from the first image;

acquiring information on multiple first regions of interest in the first image and multiple second regions of interest in the second image, each of the second regions of interest being corresponded to a different one of the first regions of interest, wherein each of the first regions of interests and the second regions of interests is an abnormal shadow or a lesion;

displaying the first image displaying of including the first regions of interest and the second image including the second regions of interest on a display;

receiving designation of a position which is an abnormal shadow in the first image displayed on the display;

specifying a designated first region of interest among the first regions of interest included in the first image on the basis of the designation of the position;

specifying a designated second region of interest corresponding to the designated first region of interest in the second image on the basis of the designated first region of interest among the second regions of interest included in the second image, and displaying the designated second region of interest corresponding to the designated first region of interest is displayed so as to be highlighted, wherein display the designated second region of interest corresponding to the designated first region of interest so as to be highlighted on the display comprising:
- in response to displaying the multiple first regions of interest in the first image and specifying the designated first region of interest among the first regions of interest included in the first image, displaying only the designated second region of interest corresponding to the designated first region of interest such that the designated second region of interest is highlighted to be distinguishable from other second regions of interest which are not displayed in the second image.

* * * * *